United States Patent
Kras et al.

(10) Patent No.: US 11,997,136 B2
(45) Date of Patent: *May 28, 2024

(54) SYSTEMS AND METHODS FOR SECURITY AWARENESS USING AD-BASED SIMULATED PHISHING ATTACKS

(71) Applicant: KnowBe4, Inc., Clearwater, FL (US)

(72) Inventors: Greg Kras, Dunedin, FL (US); Chris Cline, St. Petersburg, FL (US)

(73) Assignee: KnowBe4, Inc., Clearwater, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/982,412

(22) Filed: Nov. 7, 2022

(65) Prior Publication Data

US 2023/0073430 A1     Mar. 9, 2023

Related U.S. Application Data

(63) Continuation of application No. 17/388,924, filed on Jul. 29, 2021, now Pat. No. 11,496,514.

(60) Provisional application No. 63/059,352, filed on Jul. 31, 2020.

(51) Int. Cl.
*H04L 9/40* (2022.01)
*G09B 19/00* (2006.01)

(52) U.S. Cl.
CPC ...... *H04L 63/1483* (2013.01); *G09B 19/0053* (2013.01)

(58) Field of Classification Search
CPC .............. H04L 63/1483; G09B 19/0053
See application file for complete search history.

(56) References Cited

U.S. PATENT DOCUMENTS

| | | | |
|---|---|---|---|
| 8,615,807 B1 | 12/2013 | Higbee et al. | |
| 8,635,703 B1 | 1/2014 | Belani et al. | |
| 8,719,940 B1* | 5/2014 | Higbee | H04L 63/1483 709/206 |
| 8,910,287 B1* | 12/2014 | Belani | G06F 21/55 726/25 |

(Continued)

FOREIGN PATENT DOCUMENTS

| | | |
|---|---|---|
| EP | 3 582 468 A1 | 12/2019 |
| WO | WO-2016/164844 A1 | 10/2016 |

OTHER PUBLICATIONS

Non-Final Office Action on U.S. Appl. No. 17/388,924 dated May 17, 2022.

(Continued)

*Primary Examiner* — Malina D. Blaise
(74) *Attorney, Agent, or Firm* — Foley & Lardner LLP

(57) ABSTRACT

Systems and methods are described for modifying one or more advertisements of a webpage or a social media feed to create a simulated cybersecurity attack. Initially, content responsive to a request by a user via a user device to access a webpage or social media feed with one or more advertisements is received. One or more advertisements are detected within the content. An advertisement of the one or more advertisements is modified or replaced with simulated cybersecurity attack advertisements. The webpage or social media feed with the modified advertisement is displayed to the user device. User interactions with the simulated cybersecurity attack content are tracked and training is provided based on user interactions.

16 Claims, 16 Drawing Sheets

(56) References Cited

U.S. PATENT DOCUMENTS

| | | | |
|---|---|---|---|
| 8,966,637 B2 | 2/2015 | Belani et al. | |
| 9,053,326 B2 | 6/2015 | Higbee et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,398,038 B2 | 7/2016 | Higbee et al. | |
| 9,591,017 B1 | 3/2017 | Higbee et al. | |
| 9,667,645 B1 | 5/2017 | Belani et al. | |
| 9,876,753 B1* | 1/2018 | Hawthorn | H04L 51/214 |
| 9,912,687 B1* | 3/2018 | Wescoe | H04L 67/01 |
| 10,243,904 B1* | 3/2019 | Wescoe | G06F 21/566 |
| 10,880,322 B1* | 12/2020 | Jakobsson | H04L 51/08 |
| 10,904,186 B1 | 1/2021 | Everton et al. | |
| 10,917,429 B1* | 2/2021 | Patton | H04L 63/1433 |
| 10,986,122 B2 | 4/2021 | Bloxham et al. | |
| 11,044,267 B2 | 6/2021 | Jakobsson et al. | |
| 11,158,207 B1* | 10/2021 | Sadeh-Koniecpol | G06F 21/566 |
| 11,184,393 B1 | 11/2021 | Gendre et al. | |
| 11,297,094 B2 | 4/2022 | Huda | |
| 11,411,905 B2* | 8/2022 | Lee | H04L 63/1441 |
| 2015/0205953 A1* | 7/2015 | Belani | G06F 21/55 726/25 |
| 2015/0229664 A1* | 8/2015 | Hawthorn | H04L 63/1433 726/25 |
| 2016/0164898 A1 | 6/2016 | Belani et al. | |
| 2016/0301705 A1 | 10/2016 | Higbee et al. | |
| 2017/0103674 A1* | 4/2017 | Sadeh-Koniecpol | G06F 21/566 |
| 2017/0104778 A1* | 4/2017 | Shabtai | H04L 63/1425 |
| 2017/0126729 A1* | 5/2017 | Oberheide | H04L 63/1483 |
| 2018/0191776 A1* | 7/2018 | Irimie | H04L 51/52 |
| 2018/0255097 A1* | 9/2018 | Li | H04L 63/1483 |
| 2019/0173819 A1 | 6/2019 | Wescoe et al. | |
| 2019/0215335 A1* | 7/2019 | Benishti | H04L 63/1441 |
| 2019/0245885 A1* | 8/2019 | Starink | G06F 21/53 |
| 2019/0245894 A1* | 8/2019 | Epple | H04L 63/1483 |
| 2019/0364061 A1* | 11/2019 | Higbee | G06F 21/00 |
| 2020/0267183 A1* | 8/2020 | Vishwanath | H04L 63/1483 |
| 2020/0286015 A1* | 9/2020 | Richards | H04L 61/4511 |
| 2020/0311260 A1 | 10/2020 | Klonowski et al. | |
| 2021/0021612 A1* | 1/2021 | Higbee | H04L 63/1491 |
| 2021/0075827 A1 | 3/2021 | Grealish | |
| 2021/0185075 A1 | 6/2021 | Adams | |
| 2021/0194924 A1* | 6/2021 | Heinemeyer | G06F 21/577 |
| 2021/0344713 A1* | 11/2021 | Kras | H04L 51/18 |
| 2021/0352102 A1* | 11/2021 | Irimie | H04L 51/18 |
| 2021/0407308 A1* | 12/2021 | Brubaker | G06Q 10/0635 |
| 2022/0005373 A1* | 1/2022 | Nelson | G06N 20/00 |
| 2022/0006830 A1* | 1/2022 | Wescoe | H04L 63/1433 |
| 2022/0014115 A1 | 1/2022 | Amimoto et al. | |
| 2022/0070214 A1* | 3/2022 | Kras | H04L 63/1483 |
| 2022/0078207 A1 | 3/2022 | Chang et al. | |
| 2022/0094702 A1 | 3/2022 | Saad Ahmed et al. | |
| 2022/0100332 A1 | 3/2022 | Haworth et al. | |
| 2022/0116419 A1 | 4/2022 | Kelm et al. | |
| 2022/0130274 A1 | 4/2022 | Krishna Raju et al. | |
| 2022/0141165 A1* | 5/2022 | Lee | H04L 63/0245 709/206 |
| 2022/0286419 A1 | 9/2022 | Stetzer et al. | |

OTHER PUBLICATIONS

Notice of Allowance on U.S. Appl. No. 17/388,924 dated Aug. 24, 2022.

U.S. Office Action on U.S. Appl. No. 17/388,924 dated Nov. 15, 2021.

U.S. Office Action on U.S. Appl. No. 17/388,924 dated Feb. 15, 2022.

* cited by examiner

SYSTEMS AND METHODS FOR SECURITY AWARENESS USING AD-BASED SIMULATED PHISHING ATTACKS

CROSS-REFERENCE TO RELATED APPLICATION

This patent application is a continuation of, and claims priority to and the benefit of U.S. patent application Ser. No. 17/388,924, titled "SYSTEMS AND METHODS FOR SECURITY AWARENESS USING AD-BASED SIMULATED PHISHING ATTACKS," and filed Jul. 29, 2021, which claims the benefit of and priority to U.S. Provisional Patent Application No. 63/059,352 titled "SYSTEMS AND METHODS FOR SECURITY AWARENESS USING AD-BASED SIMULATED PHISHING ATTACKS," and filed Jul. 31, 2020, the contents of all of which are hereby incorporated herein by reference in its entirety for all purposes

TECHNICAL FIELD

The present invention generally relates to systems and methods for security awareness training using advertisement-based simulated phishing campaigns. In particular, the systems and methods relate to facilitating a simulated phishing campaign through modification of advertisements in webpages or social media feeds.

BACKGROUND

An employee of an organization may browse the Internet for information. Also, the employee may access social media sites for work related purposes and/or as a leisure activity. In some instances, the employee may access the information and/or the social media sites through a browser. In some other instances, the employee may access the information and/or the social media sites through applications installed for that purpose. During browsing or accessing social media platforms, the employee may be exposed to digital advertising that comes along with the information or content. The digital advertising may be web advertising or social media advertising. The web advertising may be a type of digital advertising that provides advertisements to target audiences through webpages. Social media advertising is a type of digital advertising where advertisement campaigns are paid for by companies to target audiences using social media platforms such as Facebook®, Twitter®, Instagram®, LinkedIn®, and other such platforms.

Employees often interact with advertisements on webpages and social media feeds. As such, the advertisements on the webpages and the social media feeds are a potential platform for phishing attacks. A phishing attack involves an attempt to acquire sensitive information such as login credentials, bank account information, credit card details, personal data, an organization's confidential data, intellectual property, corporate information, organizational assets, and any other information, often for malicious reasons, possibly by masquerading as a trustworthy entity. Phishing attacks are performed through various means such as emails, messages, malicious webpages, advertisements, and other means. Phishing attacks through advertisements on webpages and/or social media feeds are on the rise. For example, advertisements on the webpages and/or social media feeds may be of a malicious nature. In an example, a malicious advertisement may include a link, which when interacted with/accessed may lead to a webpage that performs malicious actions or tricks employees to provide sensitive information or execute a malicious program. In another example, the malicious advertisement may include malicious code, which when interacted with/accessed may download the code onto a user device and execute malicious actions such as stealing sensitive information. Accordingly, the employees need to be cautious when browsing the Internet in order to keep organization and employee data safe.

Currently, organizations undertake various security measures to prevent phishing attacks. For example, organizations may implement security means such as a firewall, an anti-phishing tool, and/or an anti-malware tool to prevent phishing attacks. To prevent phishing attacks through advertisements, organizations may implement ad blockers to prevent undesired advertisements from reaching employees. In an example, an ad blocker may be an application for blocking (or removing) an advertisement on a webpage or a social media feed to prevent the advertisement from being delivered to the employees of the organization. Websites and social media platforms that rely on revenues from user interaction with advertisements regularly update the coding structures of their advertisements such that the ad blockers fail to recognize the advertisements and thus prevent the advertisements from getting blocked. The ad blockers are also updated regularly to account for the change in the coding structures of the advertisements made by the websites and/or the social media platforms. The changing of code structures by websites and social media platforms, and updating of the ad blockers may be cyclical. In other words, there is a regular cycle of updates of websites, social media platforms, and ad blockers. As a result, it may be understood that the ad blockers may not provide fool-proof protection from malicious advertisements.

Despite the security measures, bad actors with malevolent intent such as phishers find means to circumvent and pass through the security means (for example, ad blockers) to reach the employees. Organizations have recognized the risk of failure of security measures, and the probability of the phishing attacks reaching the employees. To prevent or to reduce the success rate of phishing attacks on employees, organizations may conduct security awareness training programs for their employees, along with other security measures. Through the security awareness training programs, the organizations actively educate their employees on how to spot and report a suspected phishing attack. As a part of a security awareness training program, an organization may send out simulated phishing attacks periodically or occasionally to devices of employees and observe responses of employees to such simulated phishing attacks. A simulated phishing attack is intended to resemble a real phishing attack. The more genuine the simulated phishing attack appears, the more likely an employee will respond to it. However, real advertisements include malicious links that may be hard to replicate. It may be difficult to create simulated advertisements for such types of advertisements, and hence the simulated advertisements may have to be created from scratch. Creating simulated advertisements from scratch that resemble malicious advertisements may be time consuming, especially if created manually.

SUMMARY

Systems and methods are described for security awareness training using advertisement-based simulated phishing campaigns. The systems and methods relate to facilitating a simulated phishing campaign through modification of advertisements in webpages or social media feeds.

Systems and methods are provided for modifying one or more advertisements of a webpage or a social media feed to create a simulated phishing attack. In an example embodiment, a method of modifying one or more advertisements of a webpage or a social media feed to create a simulated phishing attack is described, which includes receiving webpage or social media feed content in response to a request by a user, the content including one or more advertisements detecting one or more advertisements within the content, and choosing an advertisement of one or more advertisements to modify to provide simulated phishing attack content; modifying the advertisement to include the simulated phishing attack content and forwarding the content with the modified advertisement to the user.

In some implementations, the method further includes intercepting the content prior to presenting the content to the user.

In some implementations, the method further includes tracking an action by the user with respect to the modified advertisement.

In some implementations, the method further includes establishing a risk score of the user based at least an action by the user with respect to the modified advertisement.

In some implementations, the method further includes modifying the advertisement to comprise one or more elements to pass through an ad blocker.

In some implementations, the method further includes modifying the advertisement by replacing the advertisement with the simulated phishing attack content in a form of an advertisement.

In some implementations, the method further includes forwarding the content with the modified advertisement and at least one genuine advertisement.

In some implementations, the method further includes forwarding causing traversal to a landing page to provide description of one of a security exploit or an action by the user with respect to the modified advertisement.

In some implementations, the method further includes causing traversal to training content responsive to the user's interaction with the modified advertisement.

In another example embodiment, a system for inserting into a webpage or a social media feed, a simulated phishing attack content in a form of an advertisement is described. The system receives content responsive to a request by a user, where the content includes one of a webpage or a social media feed; determines an advertisement to include in the content to provide a simulated phishing attack content; modifies the content to include the simulated phishing attack content in a form of the advertisement; and forwards the content with the inserted advertisement to the user.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For the purposes of reading the description of the various embodiments below, the following descriptions of the sections of the specifications and their respective contents may be helpful:

Section A describes a network environment and computing environment which may be useful for practicing embodiments described herein.

Section B describes embodiments of systems and methods for security awareness training using advertisement based simulated phishing campaigns. In particular, section B describes systems and methods relate to facilitating a simulated phishing campaign through modification of advertisements in webpages or social media feeds.

A. Computing and Network Environment

Figure 1A:
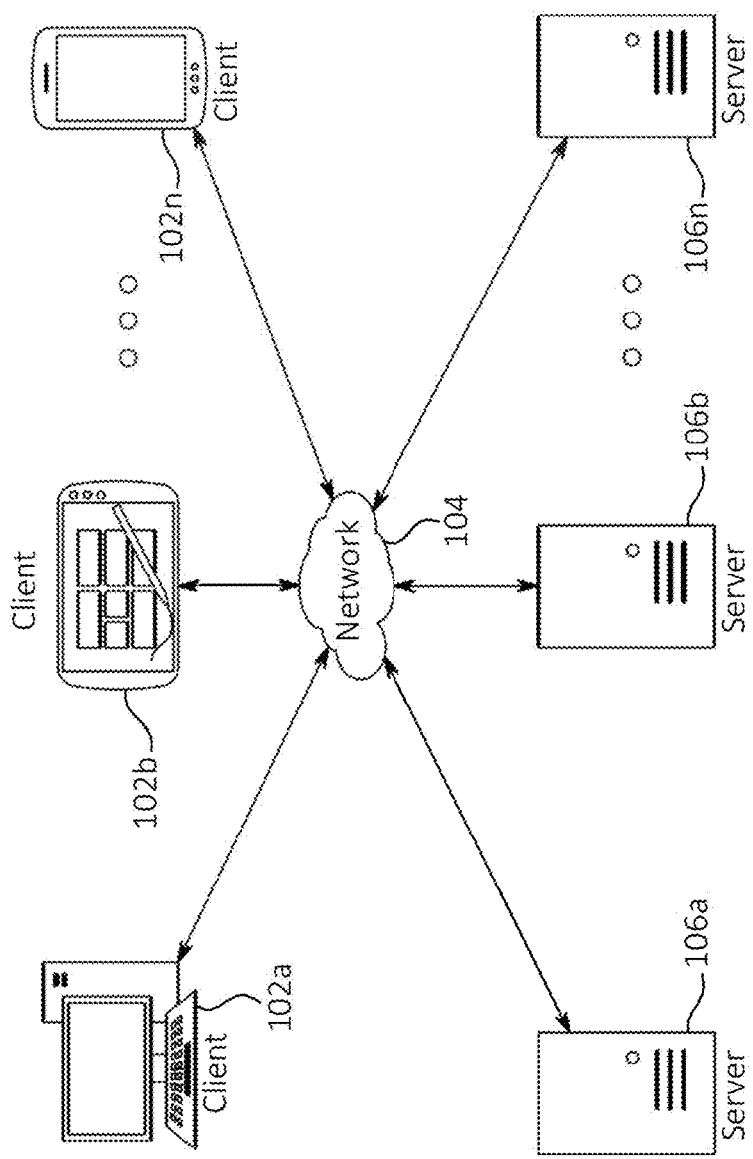
FIG. 1A is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g. hardware elements) in connection with the methods and systems described herein. Referring to FIG. 1A, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n.

Although FIG. 1A shows a network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and a network 104 may be a public network. In another of these embodiments, network 104 may be a private network and a network 104' may be a public network. In still another of these embodiments, networks 104 and 104' may both be private networks.

Network 104 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommuniations-2000 (IMT-2000) specification, and the 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g. FDMA, TDMA, CDMA, or SDMA. In some embodiments, different types of data may be transmitted via different links and standards. In other embodiments, the same types of data may be transmitted via different links and standards.

Network 104 may be any type and/or form of network. The geographical scope of the network may vary widely and network 104 can be a body area network (BAN), a personal area network (PAN), a local-area network (LAN), e.g. Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Windows, manufactured by Microsoft Corp. of Redmond, Washington), while one or more of the other servers 106 can operate according to another type of operating system platform (e.g., Unix, Linux, or Mac OSX).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Data transmission speeds between servers 106 in the machine farm can be increased if servers 106 are connected using a local-area network (LAN) connection or some form of direct connection. Additionally, a heterogeneous machine farm may include one or more servers 106 operating according to a type of operating system, while one or more other servers execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alta, California; the Xen hypervisor, an open source product whose development is overseen by Citrix Systems, Inc. of Fort Lauderdale, Florida; the HYPER-V hypervisors provided by Microsoft, or others. Hosted hypervisors may run within an operating system on a second software level. Examples of hosted hypervisors may include VMWare Workstation and VirtualBox, manufactured by Oracle Corporation of Redwood City, California. Additional layers of abstraction may include Container Virtualization and Management infrastructure. Container Virtualization isolates execution of a service to the container while relaying instructions to the machine through one operating system layer per host machine. Container infrastructure may include Docker, an open source product whose development is overseen by Docker, Inc. of San Francisco, California.

Management of the machine farm may be de-centralized. For example, one or more servers 106 may comprise components, subsystems and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, a plurality of servers 106 may be in the path between any two communicating servers 106.

Figure 1B:
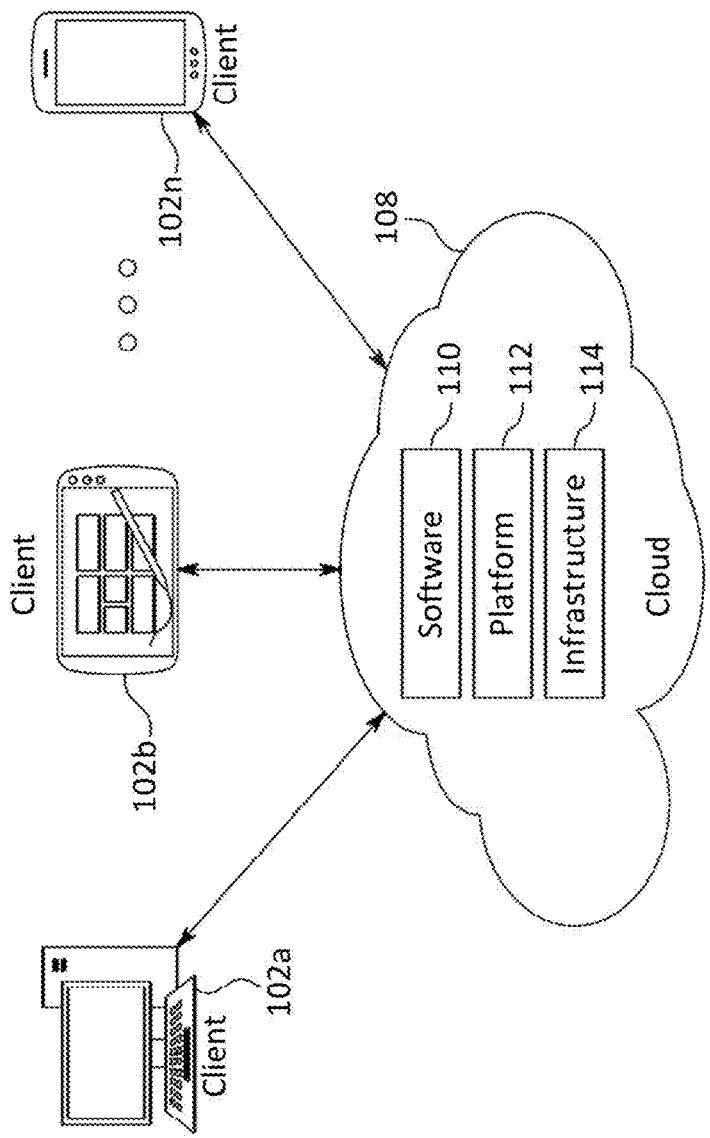
FIG. 1B is a block diagram depicting a cloud computing environment comprising client devices in communication with cloud service providers, according to some embodiments.

Referring to FIG. 1B, a cloud computing environment is depicted. A cloud computing environment may provide client 102 with one or more resources provided by a network environment. The cloud computing environment may include one or more clients 102a-102n, in communication with cloud 108 over one or more networks 104. Clients 102 may include, e.g., thick clients, thin clients, and zero clients. A thick client may provide at least some functionality even when disconnected from cloud 108 or servers 106. A thin client or zero client may depend on the connection to cloud 108 or server 106 to provide functionality. A zero client may depend on cloud 108 or other networks 104 or servers 106 to retrieve operating system data for the client device 102. Cloud 108 may include back end platforms, e.g., servers 106, storage, server farms or data centers.

Cloud 108 may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud 108 may also include a cloud-based delivery, e.g. Software as a Service (SaaS) 110, Platform as a Service (PaaS) 112, and Infrastructure as a Service (IaaS) 114. IaaS may refer to a user renting the user of infrastructure resources that are needed during a specified time period. IaaS provides may offer storage, networking, servers or virtualization resources from large pools, allowing the users to quickly scale up by accessing more resources as needed. Examples of IaaS include Amazon Web Services (AWS) provided by Amazon, Inc. of Seattle, Washington, Rackspace Cloud provided by Rackspace Inc. of San Antonio, Texas, Google Compute Engine provided by Google Inc. of Mountain View, California, or RightScale provided by RightScale, Inc. of Santa Barbara, California. PaaS providers may offer functionality provided by IaaS, including, e.g., storage, networking, servers, virtualization or containerization, as well as additional resources, e.g., the operating system, middleware, or runtime resources. Examples of PaaS include Windows Azure provided by Microsoft Corporation of Redmond, Washington, Google App Engine provided by Google Inc., and Heroku provided by Heroku, Inc. of San Francisco California. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include Google Apps provided by Google Inc., Salesforce provided by Salesforce.com Inc. of San Francisco, California, or Office365 provided by Microsoft Corporation. Examples of SaaS may also include storage providers, e.g. Dropbox provided by Dropbox Inc. of San Francisco, California, Microsoft OneDrive provided by Microsoft Corporation, Google Drive provided by Google Inc., or Apple iCloud provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g. Google Chrome, Microsoft Internet Explorer, or Mozilla Firefox provided by Mozilla Foundation of Mountain View, California). Clients 102 may also access SaaS resources through smartphone or tablet applications, including e.g., Salesforce Sales Cloud, or Google Drive App. Clients 102 may also access SaaS resources through the client operating system, including e.g. Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as and/or executed on any type and form of computing device, e.g., a computer, network device or appliance capable of communicating on any type and form of network and performing the operations described herein.

Figure 1C:
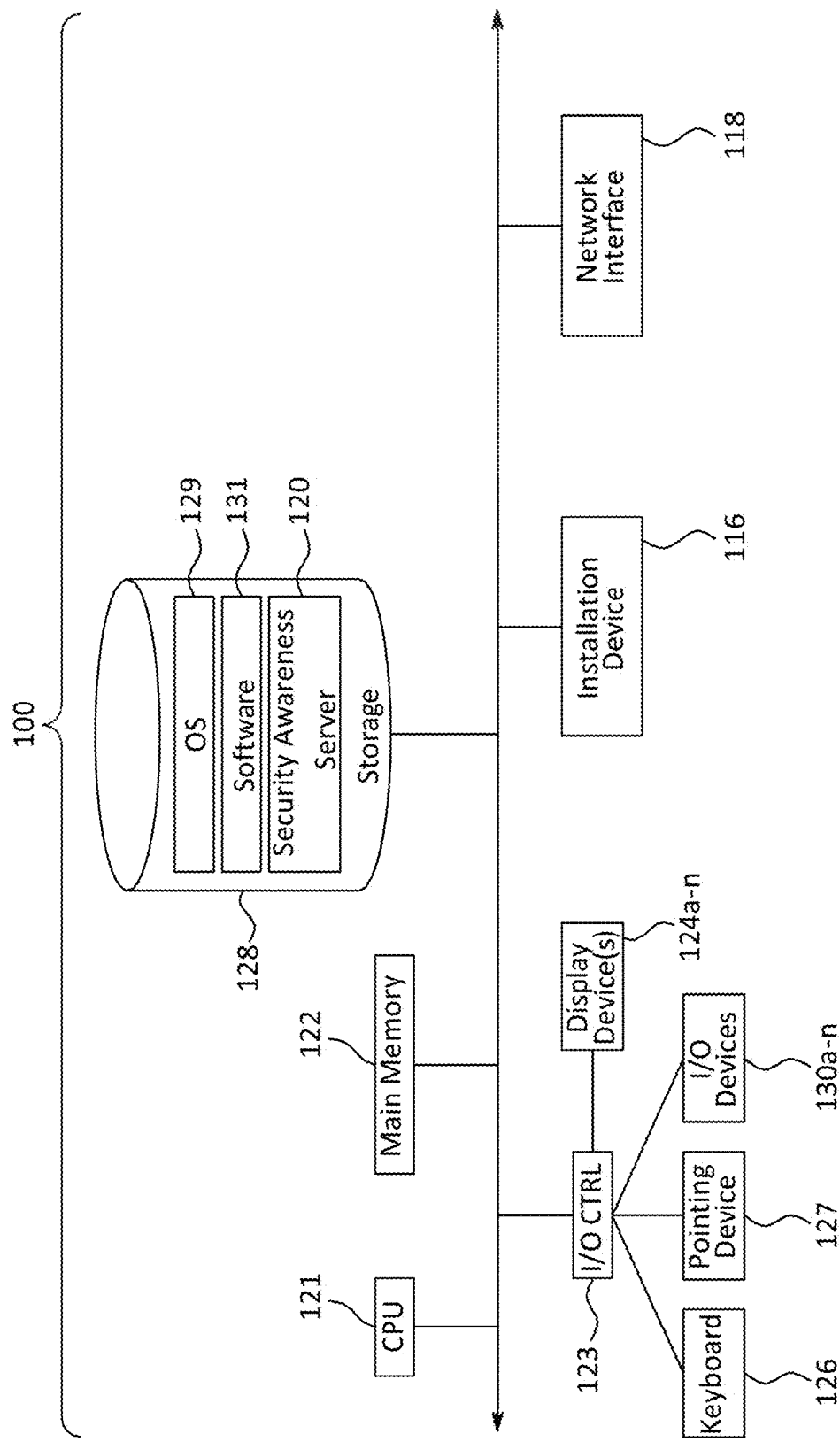
FIGS. 1C and 1D are block diagrams depicting embodiments of computing devices useful in connection with the methods and systems described herein, according to some embodiments.
Figure 1D:
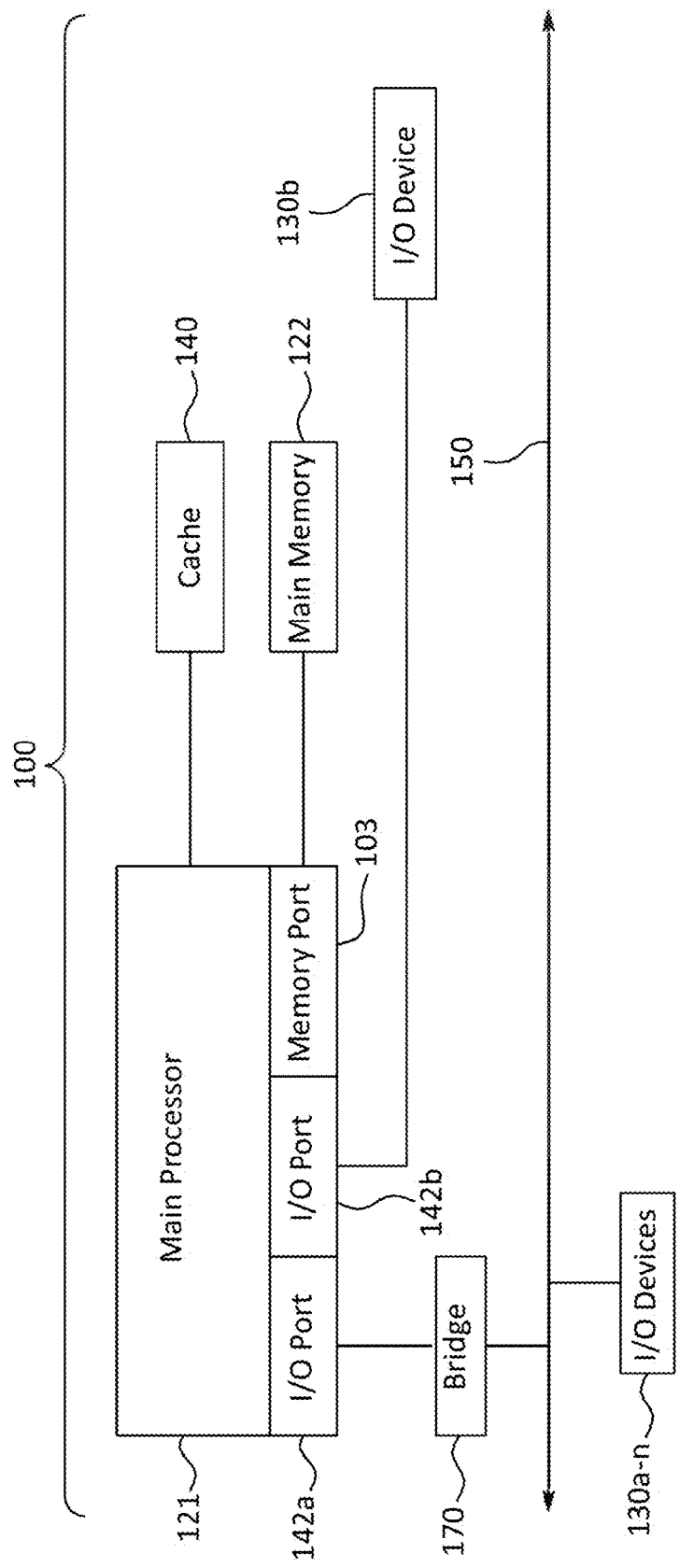

FIGS. 1C and 1D depict block diagrams of a computing device 100 useful for practicing an embodiment of client 102 or server 106. As shown in FIGS. 1C and 1D, each computing device 100 includes central processing unit 121, and main memory unit 122. As shown in FIG. 1C, computing device 100 may include storage device 128, installation device 116, network interface 118, and I/O controller 123, display devices 124a-124n, keyboard 126 and pointing device 127, e.g., a mouse. Storage device 128 may include, without limitation, operating system 129, software 131, and a software of security awareness server 120. As shown in FIG. 1D, each computing device 100 may also include additional optional elements, e.g., a memory port 103, bridge 170, one or more input/output devices 130a-130n (generally referred to using reference numeral 130), and cache memory 140 in communication with central processing unit 121.

Central processing unit 121 is any logic circuitry that responds to and processes instructions fetched from main memory unit 122. In many embodiments, central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, California; the POWER7 processor, those manufactured by International Business Machines of White Plains, N.Y.; or those manufactured by Advanced Micro Devices of Sunnyvale, Calif. Computing device 100 may be based on any of these processors, or any other processor capable of operating as described herein. Central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by microprocessor 121. Main memory unit 122 may be volatile and faster than storage 128 memory. Main memory units 122 may be Dynamic Random-Access Memory (DRAM) or any variants, including static Random-Access Memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, main memory 122 or storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. Main memory 122 may be based on any of the above described memory chips, or any other available memory chips capable of operating as described herein. In the embodiment shown in FIG. 1C, the processor 121 communicates with main memory 122 via system bus 150 (described in more detail below). FIG. 1D depicts an embodiment of computing device 100 in which the processor communicates directly with main memory 122 via memory port 103. For example, in FIG. 1D main memory 122 may be DRDRAM.

FIG. 1D depicts an embodiment in which the main processor 121 communicates directly with cache memory 140 via a secondary bus, sometimes referred to as a backside bus. In other embodiments, main processor 121 communicates with cache memory 140 using system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via local system bus 150. Various buses may be used to connect central processing unit 121 to any of I/O devices 130, including a PCI bus, a PCI-X bus, or a PCI-Express bus, or a NuBus. For embodiments in which the I/O device is video display 124, the processor 121 may use an Advanced Graphic Port (AGP) to communicate with display 124 or the I/O controller 123 for display 124. FIG. 1D depicts an embodiment of computer 100 in which main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple iPhone. Some devices 130a-130n allow gesture recognition inputs through combining some of the inputs and outputs. Some devices 130a-130n provide for facial recognition which may be utilized as an input for different purposes including authentication and other commands. Some devices 130a-130n provide for voice recognition and inputs, including, e.g., Microsoft KINECT, SIRI for iPhone by Apple, Google Now or Google Voice Search, and Alexa by Amazon.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by I/O controller 123 as shown in FIG. 1C. The I/O controller may control one or more I/O devices, such as, e.g., keyboard 126 and pointing device 127, e.g., a mouse or optical pen. Furthermore, an I/O device may also provide storage and/or installation medium 116 for computing device 100. In still other embodiments, computing device 100 may provide USB connections (not shown) to receive handheld USB storage devices. In further embodiments, a I/O device 130 may be a bridge between the system bus 150 and an external communication bus, e.g. a USB bus, a SCSI bus, a FireWire bus, an Ethernet bus, a Gigabit Ethernet bus, a Fiber Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or auto stereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, computing device 100 may include or connect to multiple display devices 124a-124n, which each may be of the same or different type and/or form. As such, any of I/O devices 130a-130n and/or the I/O controller 123 may include any type and/or form of suitable hardware, software, or combination of hardware and software to support, enable or provide for the connection and use of multiple display devices 124a-124n by computing device 100. For example, computing device 100 may include any type and/or form of video adapter, video card, driver, and/or library to interface, communicate, connect or otherwise use display devices 124a-124n. In one embodiment, a video adapter may include multiple connectors to interface to multiple display devices 124a-124n. In other embodiments, computing device 100 may include multiple video adapters, with each video adapter connected to one or more of display devices 124a-124n. In some embodiments, any portion of the operating system of computing device 100 may be configured for using multiple displays 124a-124n. In other embodiments, one or more of the display devices 124a-124n may be provided by one or more other computing devices 100a or 100b connected to computing device 100, via network 104. In some embodiments, software may be designed and constructed to use another computer's display device as second display device 124a for computing device 100. For example, in one embodiment, an Apple iPad may connect to computing device 100 and use the display of the device 100 as an additional display screen that may be used as an extended desktop. One ordinarily skilled in the art will recognize and appreciate the various ways and embodiments that computing device 100 may be configured to have multiple display devices 124a-124n.

Referring again to FIG. 1C, computing device 100 may comprise storage device 128 (e.g. one or more hard disk drives or redundant arrays of independent disks) for storing an operating system or other related software, and for storing application software programs such as any program related to security awareness server 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to computing device 100 via bus 150. Some storage device 128 may be external and connect to computing device 100 via a I/O device 130 that provides an external bus. Some storage device 128 may connect to computing device 100 via network interface 118 over network 104, including, e.g., the Remote Disk for MACBOOK AIR by Apple. Some client devices 100 may not require a non-volatile storage device 128 and may be thin clients or zero clients 102. Some storage device 128 may also be used as an installation device 116 and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Computing device 100 (e.g., client device 102) may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on client device 102. An application distribution platform may include a repository of applications on server 106 or cloud 108, which clients 102a-102n may access over a network 104. An application distribution platform may include application developed and provided by various developers. A user of client device 102 may select, purchase and/or download an application via the application distribution platform.

Furthermore, computing device 100 may include a network interface 118 to interface to network 104 through a variety of connections including, but not limited to, standard telephone lines LAN or WAN links (e.g., 802.11, T1, T3, Gigabit Ethernet, InfiniBand), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMAX and direct asynchronous connections). In one embodiment, computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. Network interface 118 may comprise a built-in network adapter, network interface card, PCMCIA network card, EXPRESSCARD network card, card bus network adapter, wireless network adapter, USB network adapter, modem or any other device suitable for interfacing computing device 100 to any type of network capable of communication and performing the operations described herein.

Computing device 100 of the sort depicted in FIGS. 1B and 1C may operate under the control of an operating system, which controls scheduling of tasks and access to system resources. Computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, WINDOWS 8 and WINDOW 10, all of which are manufactured by Microsoft Corporation of Redmond, Wash.; MAC OS and iOS, manufactured by Apple, Inc.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google Inc., among others. Some operating systems, including, e.g., the CHROME OS by Google Inc., may be used on zero clients or thin clients, including, e.g., CHROMEBOOKS.

Computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. Computer system 100 has sufficient processor power and memory capacity to perform the operations described herein. In some embodiments, computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, computing device 100 is a gaming system. For example, the computer system 100 may comprise a PLAYSTATION 3, or PERSONAL PLAYSTATION PORTABLE (PSP), PLAYSTATION VITA, PLAYSTATION 4, or a PLAYSTATION 4 PRO device manufactured by the Sony Corporation of Tokyo, Japan, or a NINTENDO DS, NINTENDO 3DS, NINTENDO WII, NINTENDO WII U, or a NINTENDO SWITCH device manufactured by Nintendo Co., Ltd., of Kyoto, Japan, or an XBOX 360 device manufactured by Microsoft Corporation.

In some embodiments, computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, computing device 100 is a tablet e.g. the IPAD line of devices by Apple; GALAXY TAB family of devices by Samsung; or KINDLE FIRE, by Amazon.com, Inc. of Seattle, Wash. In other embodiments, computing device 100 is an eBook reader, e.g. the KINDLE family of devices by Amazon.com, or NOOK family of devices by Barnes & Noble, Inc. of New York City, New York.

In some embodiments, communications device 102 includes a combination of devices, e.g. a smartphone combined with a digital audio player or portable media player. For example, one of these embodiments is a smartphone, e.g. the iPhone family of smartphones manufactured by Apple, Inc.; a Samsung GALAXY family of smartphones manufactured by Samsung, Inc; or a Motorola DROID family of smartphones. In yet another embodiment, communications device 102 is a laptop or desktop computer equipped with a web browser and a microphone and speaker system, e.g. a telephony headset. In these embodiments, communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, the information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Security Awareness Training Using Advertisement Based Simulated Phishing Campaigns The following describes systems and methods for security awareness training using advertisement based simulated phishing campaigns. The systems and the methods further relate to facilitating a simulated phishing campaign through modification of advertisements in webpages or social media feeds.

The systems and the methods of the present disclosure leverage a security awareness server that identifies one or more advertisements from webpages and/or social media feeds, and uses the one or more advertisements to create simulated phishing attacks. In an example, the one or more advertisements may be malicious or not malicious (genuine). An advertisement may be malicious if the advertisement includes one or more malicious elements such as malicious actionable links, malicious attachments, or any other kind of malicious elements. Further, an advertisement may be not malicious if the advertisement includes one or more benign elements such as benign actionable links, or any other kind of benign element, with a purpose of persuading a user to avail a product and/or a service the advertisement is offering.

In an implementation, the security awareness server may intercept webpages and/or social media feeds having one or more advertisements directed towards a user to identify the one or more advertisements. In some implementations, the security awareness server may identify advertisements that the user may have already viewed. In some implementations, the security awareness server may identify one or more advertisements that may have been blocked by an ad blocker. In response to identifying the advertisements, the security awareness server may modify the advertisements to create a simulated phishing advertisement. In an example, the security awareness server may modify elements/contents (for example, a link and/or an attachment) of the advertisements before the advertisements along with the webpage and/or social media feed is delivered to the user. For example, the security awareness server may substitute an actionable or an interactive link and/or an attachment of the one or more advertisements with a training link and/or a training attachment, respectively.

The security awareness server may execute a simulated phishing attack or a simulated phishing campaign. The simulated phishing campaign may comprise of one or more simulated phishing attacks. The simulated phishing campaign may, for example, target a single user or a group of users, such as employees of a business unit of an organization for imparting cybersecurity awareness. The simulated phishing campaign may be carried out for specific purposes including identifying security awareness levels of users, updating risk scores of the users, and giving enhanced training to more vulnerable groups in the organization. In an example, the security awareness server may initiate the simulated phishing campaign by communicating the simulated phishing advertisements to the target group of users or all users of the organization. The simulated phishing advertisements may serve a purpose of training the users to recognize advertisements and to gauge the security awareness of the users who interact with the simulated phishing advertisements for further security awareness training. Accordingly, the advertisements may be detected, neutralized (made safe), and used for training the users of the organization by the security awareness server. The users are thereby educated about security risks associated with malicious advertisements. Further, automatic interception and modification of the malicious advertisements may significantly minimize the need for human intervention in generating and sending simulated phishing advertisements to multiple users of the organization.

Figure 2:
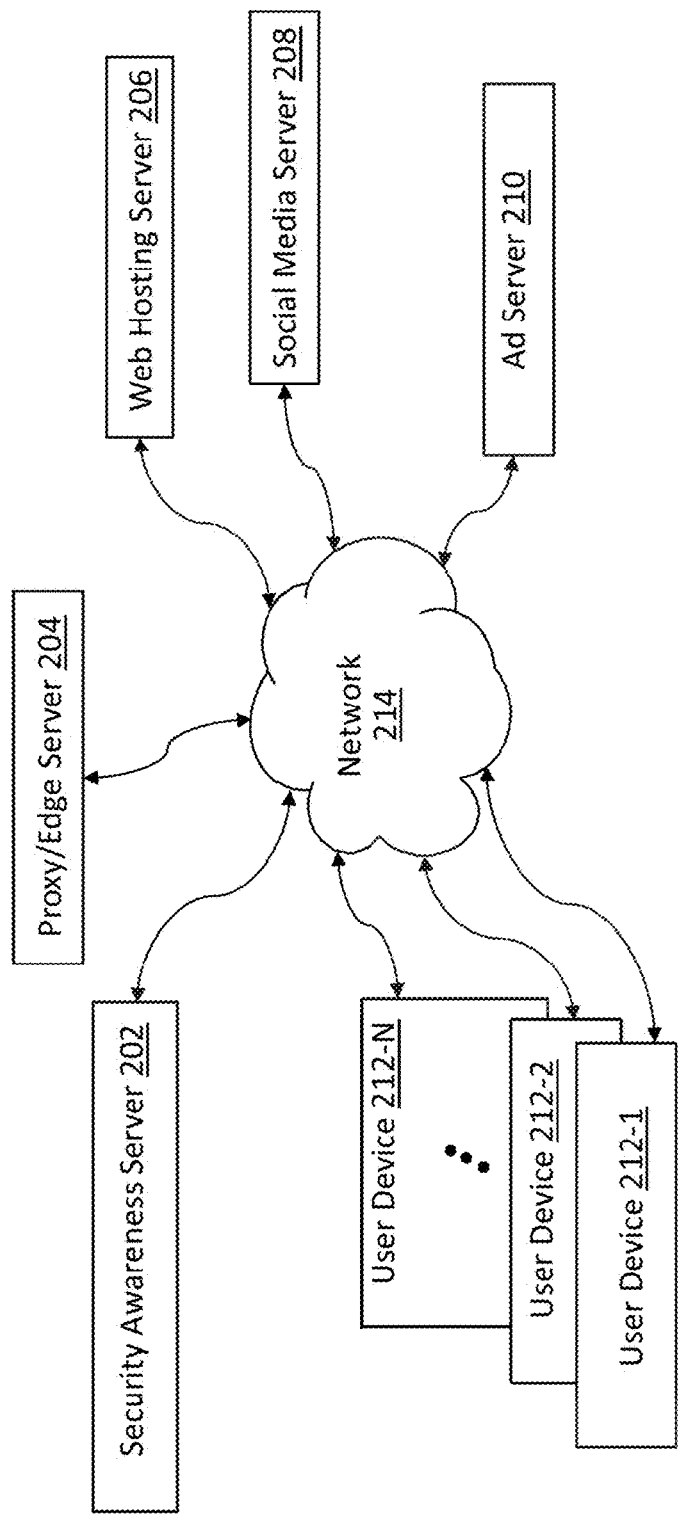
FIG. 2 depicts an implementation of some of an architecture of an implementation of a system for modifying one or more advertisements of a webpage or a social media feed to create a simulated phishing attack, according to some embodiments.

FIG. 2 depicts an implementation of some of the architecture of an implementation of system 200 to create an advertisement based simulated phishing attack or simulated phishing campaign, according to some embodiments.

System 200 may include security awareness server 202, proxy/edge server 204, web hosting server 206, social media server 208, ad server 210, a plurality of user devices 212(1-N) (collectively referred to as user device 212), and network 214 enabling communication between the system components for information exchange. Network 214 may be an example or instance of network 104, details of which are provided with reference to FIG. 1A and its accompanying description. In an implementation, web hosting server 206 and social media server 208 may individually or collectively be referred to as a content server.

According to some embodiments, each of security awareness server 202, proxy/edge server 204, web hosting server 206, social media server 208, and ad server 210, may be implemented in a variety of computing systems, such as a mainframe computer, a server, a network server, a laptop computer, a desktop computer, a notebook, a workstation, and the like. In an implementation, each of security awareness server 202 (interchangeably referred to as server 202), proxy/edge server 204, web hosting server 206, social media server 208, and ad server 210 may be implemented in a server, such as server 106 shown in FIG. 1A. In some implementations, each of security awareness server 202 may be implemented by a device, such as computing device 100 shown in FIGS. 1C and 1D. In some embodiments, each of security awareness server 202, proxy/edge server 204, web hosting server 206, social media server 208, and ad server 210 may be implemented as a part of a cluster of servers. In some embodiments, each of security awareness server 202, proxy/edge server 204, web hosting server 206, social media server 208, and ad server 210 may be implemented across a plurality of servers, thereby, tasks performed by each of security awareness server 202, proxy/edge server 204, web hosting server 206, social media server 208, and ad server 210 may be performed by the plurality of servers. These tasks may be allocated among the cluster of servers by an application, a service, a daemon, a routine, or other executable logic for task allocation.

Security awareness server 202 may be owned or managed or otherwise associated with an organization or any entity authorized thereof. In an implementation, security awareness server 202 may facilitate cybersecurity awareness training via simulated phishing attacks. A simulated phishing attack is a technique of testing a user to see if the user is likely to recognize a true malicious phishing attack and act appropriately upon receiving the malicious phishing attack. The simulated phishing attack may include links, attachments, macros, or any other simulated phishing threat that resembles a real phishing threat. In response to user interaction with the simulated phishing attack, for example if the user clicks on a link (i.e., simulated phishing link), the user may be provided with a security awareness training.

In an example, security awareness server 202 may be a Computer Based Security Awareness Training (CBSAT) system that performs security services such as performing simulated phishing attacks on a user or a set of users of the organization as a part of security awareness training. The user may be an employee of the organization. In an example, security awareness server 202 may provide the security awareness training to the users for advertisement-based (ad-based) threats.

In one or more embodiments, security awareness server 202 may operate in collaboration with proxy/edge server 204 to intercept content prior to delivery/presentation of the content to user devices 212. In an implementation, the content may be intercepted at proxy/edge server 204. In an example, the content may include webpages and/or application feeds such as social media feeds that include advertisements. The content as discussed herein may be requested by a user via a user device. A social media feed may be understood as a listing of content that has been collected from a social media platform (for example, through social media server 208), such as Facebook®, Twitter®, and other social media platforms. An advertisement (interchangeably referred to as 'ad') may be a form of online advertising employing the Internet to deliver promotional marketing messages to consumers (for example, the users of the organization). Advertisers or companies use techniques such as Search Engine Marketing (SEM), Search Engine Optimization (SEO), social media advertising (e.g., Facebook®, Twitter®, LinkedIn®, and Instagram®), video advertising, and display advertising (e.g., banners, landing pages, and pop-ups that do not show up in search results) to distribute advertisements through webpages and/or social media platforms.

In some embodiments, proxy/edge server 204 may be a server application that is intermediary between a client and a server. In an example, proxy/edge server 204 may act as an intermediary for requests from users of an organization seeking resources (such as webpages, social media feeds, and any other resources) from various resource servers (for example, web hosting server 206 and social media server 208) that provide those resources.

In an example, proxy/edge server 204 may function on behalf of the users when requesting resources, while sometimes potentially masking the origin of the requests to the resource servers. In an implementation, proxy/edge server 204 may be an end point to which a web browser of a user may connect. Accordingly, when the user makes a request (for example, a HTTP request), the request is first sent to proxy/edge server 204. Proxy/edge server 204 may evaluate the request and forward the request to an Internet address corresponding to the request. In an example, proxy/edge server 204 may implement a HTTP protocol and may be configured to serve custom error pages (for example, 404 error page) to the user. Proxy/edge server 204 may also perform whitelisting/blacklisting of Internet Protocol (IP) addresses, restrict access to particular Uniform Resource Locator (URLs), and various other functions. Known examples of proxy/edge server 204 include Apache™ HTTP server and WinGate®.

Although security awareness server 202 and proxy/edge server 204 are shown as separate entities, security awareness server 202 and proxy/edge server 204 may be implemented as a single entity and managed by the organization or any entity authorized thereof. In an example, proxy/edge server 204 may be a hub, and all Internet traffic that enters the organization, may pass through proxy/edge server 204. In an implementation, proxy/edge server 204 may be implemented, for example, inside a security firewall of the organization.

According to some embodiments, web hosting server 206 may be a server, a computer, or a group of computers that hosts a website and/or related data, applications, and/or services. In some examples, web hosting server 206 may host a plurality of websites, related data, applications, and/or services. In an example, website(s) may be accessed over the Internet as web hosting server 206 may publish the website(s) online. In an implementation, web hosting server 206 may be configured to provide a webpage corresponding to a website to a user in response to a request by the user. Known examples of web hosting server 206 include, Google® server (cloud server), Apache® HTTP server, Amazon® server (cloud server), and the like. Some known examples of web hosting server 206 that host multiple websites include, but are not limited to, Bluehost® and GoDadddy®.

Referring again to FIG. 2, in some embodiments, social media server 208 may be a server that hosts and maintains one or more social media websites. In an implementation, social media server 208 may be configured to provide a social media feed corresponding to a social media website to a user in response to a request by the user. Examples of the social media websites include, but are not limited to, Facebook®, Twitter®, Instagram®, and LinkedIn®.

In an implementation, social media server 208 may be a part of a social network platform. Social media server 208 may interchangeably be referred to as social media platform 208 or web server 208. In an implementation, social media server 208 may include one or more databases (or a datacenter), a front-end presentation layer, a back-end presentation layer, a business layer, and a data access layer. Social media server 208 may be a distributed server and may have a caching system which may be username based. In an implementation, social media server 208 may include an internal ad server. In some other implementations, social media server 208 may connect to one or more external ad servers.

Referring again to FIG. 2, in some embodiments, ad server 210 may be a server that stores advertisements and other content (non-advertisement content). In an example, ad server 210 may be used by publishers and/or advertisers (for example, contracted by product/service companies) to serve advertisements to potential customers with web content. In an implementation, ad server 210 may serve the advertisements and the other content to webpages and/or social media feeds. In some examples, ad server 210 may provide a tracking functionality and a reporting functionality for the advertisements. For example, the tracking functionality may be enabled via cookies. Known examples of ad server 210 include OpenX™ and Sizmek®.

In an implementation, ad server 210 may allow advertisers to serve/target advertisements to a user based on various parameters such as a user profile, behavior of the user, consumption patterns of the user, historical data of the user, frequency of advertisements targeted for the user, context of content, a sequencing for the advertisements (i.e., arrangement of the advertisements in a particular order to be shown to the user), and the like. In some implementations, ad server 210 may also provide exclusivity and context of content of the advertisements to the advertisers/publishers. To elaborate exclusivity and context of content, the ad server 210 may provide options for allowing one type of advertiser to send advertisements to a user on a given media outlet. For example, a car dealer who has paid to have exclusivity of car dealership advertisements delivered to a certain user may be allowed to serve the car dealership advertisements to the user whenever the user accesses automobile related information. In an implementation, ad server 210 may be a first-party ad server (or a local server) that may be run by a publisher. In an example, the first-party ad server may serve advertisements on the publisher's domain. In some implementations, ad server 210 may be a third-party ad server that may be used by an advertiser. In an example, third-party ad server may be capable of serving advertisements to webpages on any domain.

Referring again to FIG. 2, in some embodiments, user devices 212-(1-N) may be any device used by a user. The user may be an employee of an organization or any entity. In an example, user device 212 may be provided by the organization. In instances of user device 212 being provided by the organization and/or used for accessing organization resources, the organization may require the user to install specific applications or environments that may allow the organization to manage and control various security aspects of user device 212 of the user. In some embodiments, the user device 212 may a personal device that may be used for connecting with organization's server for accessing organization resources such as emails, calendar, and other resources. In examples, the organization may require the user to install specific applications or environments (such as VPN) on user device 212 to enable the organization to protect, manage, and control various security aspects and organizational content. In an implementation, a web browser may be installed on user device 212. The user may also have one or more applications installed on user device 212 that may enable the user to access web content or social media websites, such as Facebook®, Twitter®, LinkedIn®, and other social media platforms. Accordingly, user device 212 may be equipped with organization-controlled applications. In an implementation, user device 212 may include both personal environment and work environment. In an example, the work environment may be managed by the organization, for example via Mobile Device Management (MDM) or Enterprise Mobility Management (EMM).

According to some embodiments, security awareness server 202 may be configured to modify one or more advertisements of a webpage or a social media feed to create an advertisement based simulated phishing attack (interchangeably referred to as ad-based simulated phishing attack).

In operation, a user of user device 212 may make an HTTP request to web hosting server 206 (where the requested webpage is hosted) and/or social media server 208 (where a social media website pertaining to the social media feed is hosted) via user device 212 for content. In an embodiment, the HTTP request may be sent from user device 212 to web hosting server 206 and/or social media server 208 via proxy/edge server 204. In an implementation, proxy/edge server 204 may forward the HTTP request to web hosting server 206 or social media server 208, and may receive the requested content through webpage or the social media feed in response. The webpage or the social media feed received at proxy/edge server 204 may include one or more advertisements. The one or more advertisements may be provided by web hosting server 206 or social media server 208 by retrieving the one or more advertisements from ad server 210. The web hosting server 206 or social media server may embed/insert the one or more advertisements in the webpage or the social media feed, respectively, before returning the webpage or the social media feed to proxy/edge server 204 and/or user device 212.

In an implementation, proxy/edge server 204 may receive the webpage or the social media feed with the one or more advertisements from web hosting server 206 or social media server 208, respectively. Proxy/edge server 204 may then analyze the webpage or the social media feed to detect one or more advertisements within the content of webpage or the social media feed. Upon detecting the one or more advertisements, proxy/edge server 204 may determine an advertisement of the one or more advertisements to modify or replace to provide a simulated phishing attack content. In an example, the simulated phishing attack content may be in a form of an advertisement (also referred to as a new advertisement) and/or other content (non-advertisement content). In an implementation, the simulated phishing attack content may be generated by security awareness server 202. Proxy/edge server 204 may retrieve the simulated phishing attack content from security awareness server 202. Thereafter, proxy/edge server 204 may modify the advertisement to include the simulated phishing attack content. In an implementation, proxy/edge server 204 may modify the advertisement by partially modifying or completely replacing the advertisement with the simulated phishing attack content in the form of the advertisement. In some implementations, proxy/edge server 204 may modify the advertisement by replacing the advertisement with the simulated phishing attack content in the form of the other content (for example, a content, an article, or any other representation of information). Proxy/edge server 204 may then forward the webpage or the social media feed with the modified advertisement or other content to user device 212 of the user as a response to the request made by the user.

In some embodiments, the steps performed by proxy/edge server 204 in modifying the advertisement of the webpage or the social media feed may be performed by security awareness server 202. Security awareness server 202 may perform some or all of these steps prior to forwarding the webpage or the social media feed with the modified advertisement to user device 212 of the user responsive to the request by the user. The manner in which the one or more advertisements of the webpage or the social media feed are modified to create a simulated phishing attack is explained in greater detail in conjunction with following figures.

Figure 3:
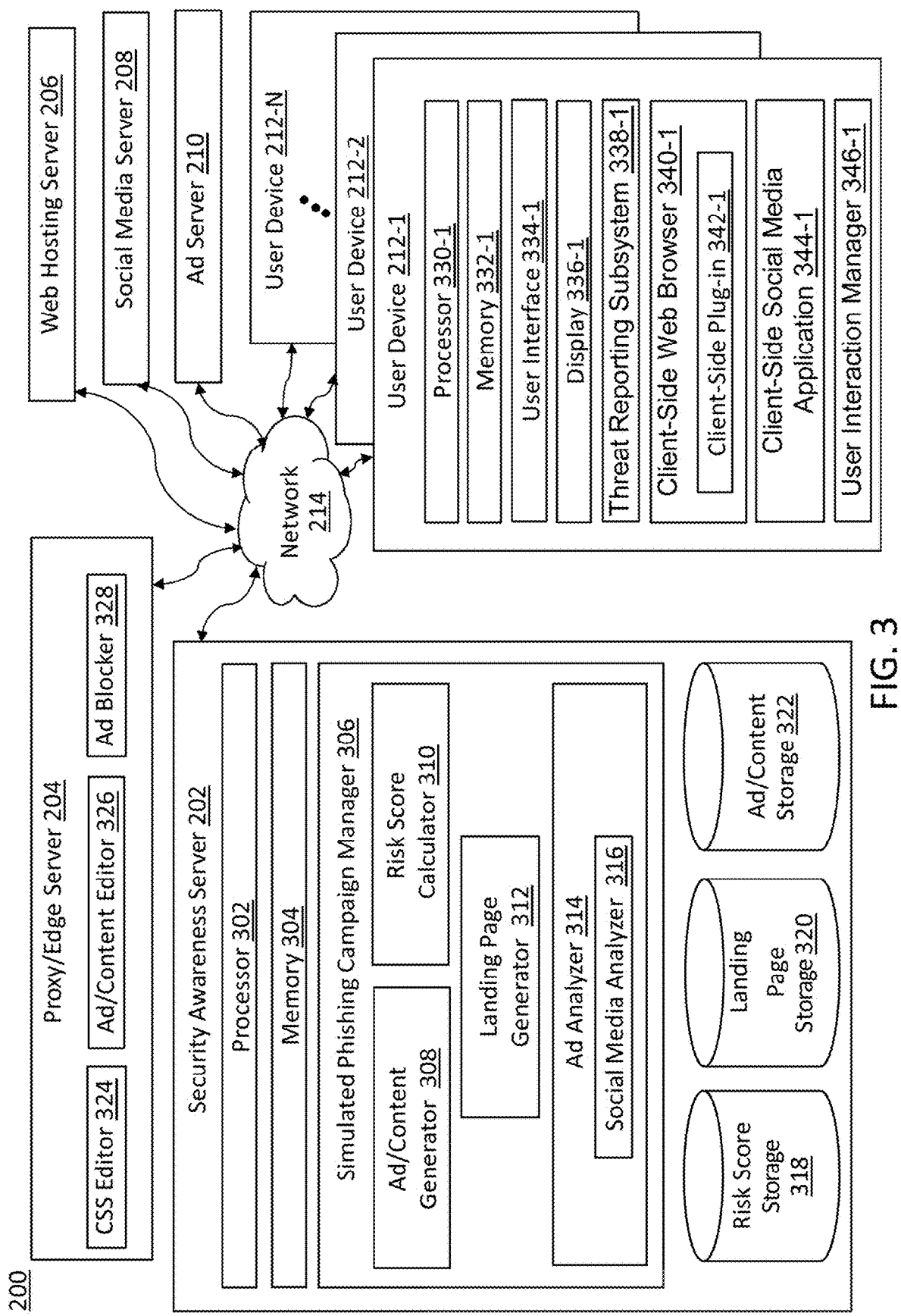
FIG. 3 depicts a detailed view of some of the architecture of the system of FIG. 2, according to some embodiments.

FIG. 3 depicts a detailed view of some of the architecture of the system 200 of FIG. 2, according to some embodiments.

According to some embodiments, security awareness server 202 may include processor 302 and memory 304. For example, processor 302 and memory 304 of security awareness server 202 may be CPU 121 and main memory 122 respectively as shown in FIGS. 1C and 1D. Further, security awareness server 202 may include simulated phishing campaign manager 306. Simulated phishing campaign manager 306 may include various functionalities that may be associated with cybersecurity awareness training. In an implementation, simulated phishing campaign manager 306 may be an application or a program that manages various aspects of a simulated phishing attack, for example, tailoring and/or executing a simulated phishing attack. In some implementations, simulated phishing campaign manager 306 may remove the advertisement and replace the advertisement with a simulated phishing attack. In some implementations, simulated phishing campaign manager 306 may modify the advertisement by modifying links in the advertisement to include a simulated phishing attack link, replacing links with a simulated phishing attack link, adding links containing a simulated phishing attack link, modifying content to include a simulated phishing attack content, replacing content with the simulated phishing attack content, and adding content to include the simulated phishing attack content. In some implementations, simulated phishing campaign manager 306 may create or generate new advertisements. In scenarios where simulated phishing campaign manager 306 determines to insert newly created advertisements, simulated phishing campaign manager 306 may create and arrange the content and the links in the content/advertisements, which may be based on a template e.g. a template used by ad/content generator 308.

A simulated phishing attack may test the readiness of a user in handling phishing attacks such that malicious actions are prevented. For instance, simulated phishing campaign manager 306 may monitor and control timing of various aspects of a simulated phishing attack, may process requests for access to attack results, or may perform other tasks related to the management of a simulated phishing attack. In an implementation, simulated phishing campaign manager 306 may execute simulated phishing campaigns according to certain criteria that provide a campaign configuration. In one or more embodiments, a simulated phishing attack may interchangeably be referred to as ad-based simulated phishing attack. In an implementation, simulated phishing campaign manager 306 may include a server component, a proxy/edge server component which may be implemented inside a security firewall of the organization, and/or one or more client plug-ins, add-ins, or extensions.

In some embodiments, simulated phishing campaign manager 306 may include ad/content generator 308. Ad/content generator 308 may be an application, program, service, daemon, routine, or other executable logic for generating simulated phishing attack content. The simulated phishing attack content may include an advertisement and/or other content (non-advertisement content) that are be included in webpages and/or social media feeds. In an example, the other content may be of the same format as an advertisement on a webpage or a social media feed, or a similar webpage or a social media feed. The simulated phishing attack content generated by ad/content generator 308 may be of any appropriate format. In an example, the simulated phishing attack content may include one or more simulated malicious interactive elements (that are benign in nature). An example of the simulated malicious interactive element includes an URL. The simulated malicious interactive element may interchangeably be referred to as an interactive element or an actionable element.

In an example, the simulated phishing attack content may be an online advertisement and/or non-advertisement content that is contextually geared towards the organization or users of the organization. As may be understood, the effectiveness of simulated phishing attacks for security awareness training may be enhanced through the use of simulated phishing attack content that appears highly realistic and has particular relevance to a user. Realistic and relevant simulated phishing attack content may increase a likelihood of the user interacting with the simulated phishing attack content. In an implementation, ad/content generator 308 may create/generate simulated phishing attack content that may be highly relevant to a specific user. In an example, ad/content generator 308 may generate the simulated phishing attack content using information related to the user, such as user attributes, organization information, or any other information that is relevant to the user. For example, based on a name of an organization that the user works for and/or a location of a user device, ad/content generator 308 may generate an advertisement that may refer to news about layoffs within the organization of the user that has taken place or is likely to take place. In another example, ad/content generator 308 may generate an advertisement that may refer to pandemics and rapid antigen testing that are taking place around the user's organization or place of residence. The simulated phishing attack content may be used in simulated phishing attacks or simulated phishing campaigns. In an implementation, simulated phishing campaign manager 306 may embed/insert the simulated phishing attack content in place of one or more advertisements of a webpage or a social media feed to simulate an advertising-based attack. In some implementations, simulated phishing campaign manager 306 may embed/insert the simulated phishing attack content as an advertisement in the webpage or the social media feed by rearranging the objects in landing page to simulate the advertisement-based attack. In some implementations, simulated phishing campaign manager 306 may embed/insert the simulated phishing attack content in the webpage or the social media feed to simulate the advertising-based attack. In an implementation, simulated phishing campaign manager 306 may embed/insert the simulated phishing attack content in place of non-advertisement content of a webpage or a social media feed to simulate an advertising-based attack.

Referring back to FIG. 3, in some embodiments, simulated phishing campaign manager 306 may include risk score calculator 310. Risk score calculator 310 may be an application or a program for determining and maintaining risk scores for users in an organization. A risk score of a user may be a representation of vulnerability of the user to a malicious attack. In an implementation, risk score calculator 310 may maintain more than one risk score for each user. In an example, each risk score may represent a specific aspect of the user's security awareness level. In an implementation, risk score calculator 310 may calculate risk scores for a group of users, the organization, an industry to which the organization belongs, a geography, and so on. In an example, a risk score of the user may be modified based on the user's responses to simulated phishing attacks, completion of training by the user, a current position of the user in the organization, a size of a network of the user, an amount of time the user has held the current position in the organization, and/or any other attribute that can be associated with the user.

Simulated phishing campaign manager 306 may include landing page generator 312. In an implementation, landing page generator 312 may be an application or a program for creation or modifying the landing pages to facilitate security awareness training of users in the organization. In an example, a landing page (also referred to as a destination page) may be a webpage or an element of webpage that appears in response to user interaction such as clicking on a link, a search result, or an online advertisement to provision training materials.

In some embodiments, simulated phishing campaign manager 306 may include ad analyzer 314. In an implementation, ad analyzer 314 may be an application or a program that analyzes structure of advertisements on various sources such as webpages, social media feeds, and the like, to evaluate the advertisements that are least likely to get blocked by an ad blocker. Based on the evaluation, ad/content generator may generate advertisement based simulated phishing attacks and other content and/or modifies the simulated phishing attack in a manner such that the resulting simulated phishing attack content has the highest probability of passing through the ad blocker.

In an embodiment, ad analyzer 314 may include social media analyzer 316. Social media analyzer 316 may be an application or a program that is configured to analyze structure of advertisements on social media platforms such that simulated phishing attack content can be created reflecting the latest structures of the advertisements to ensure a high probability of the simulated phishing attack content reaching consumers (such as users of an organization), without getting blocked by ad blockers. In an implementation, social media analyzer 316 may be a specific implementation of an ad analyzer which analyzes how social media platforms or other platforms should code and deliver digital advertising to help it pass through an ad blocker. Since social media platforms such as Facebook® and Twitter® make significant revenues through serving advertisement to consumers, the social media platforms regularly change structures of their advertisements so that the advertisements that they serve do not get blocked by ad blockers and get through to consumers. Further, simulated phishing campaign manager 306 may include a server component and/or one or more client plug-ins, add-ins, or extensions.

Referring back to FIG. 3, in some embodiments, security awareness server 202 may include risk score storage 318, landing page storage 320, and ad/content storage 322. In an implementation, risk score storage 318 may store risk scores of users of an organization, landing page storage 254 may store landing page templates, and ad/content storage 322 may store the simulated phishing attack content. The risk scores of the users stored in risk score storage 318, the landing page templates stored in landing page storage 320, and the simulated phishing attack content in ad/content storage 322 may be periodically or dynamically updated as required. In an implementation, risk score storage 318, landing page storage 320, and ad/content storage 322 may be located within the security firewall of the organization or any other locations, and may be accessible by security awareness server 202.

According to some embodiments, proxy/edge server 204 may include Cascading Style Sheets (CSS) editor 324, ad/content editor 326, and ad blocker 328. In an implementation, CSS editor 324 may be an application or a program that controls how HTML elements are to be displayed on a screen, a paper, or in other media. In an example, CSS editor 324 may be configured to control the layout of multiple webpages of a website all at once using a single file (for example, a CSS file). For example, instead of having to go into each webpage's HTML code and make changes, the CSS file may be used to make broad changes across all the webpages of the website. In an example, external stylesheets are stored in CSS files. In an implementation, CSS editor 324 may allow simulated phishing campaign manager 306 to edit content in an HTML element. A known example of CSS editor 324 includes Style Master®.

In an embodiment, CSS editor 324 may include CSS filters to achieve varying visual effects in an HTML element, such as a blurring effect or a color shifting effect in the HTML element before the HTML element is displayed. In an example, CSS filters are used to adjust the rendering of an image, a background, or a border. An example code excerpt of a CSS filter is provided below.

```
.filter-me {
    filter: <filter-function> [<filter-function>]* | none
}
```

Further, an example code excerpt of a CSS filter with a single action is provided below.

```
.blur-me {
    filter: blur(20px);
}
```

An example code excerpt of a CSS filter with more than one action is provided below.

```
.do-more-things {
    filter: blur(20px) grayscale(20%);
}
```

In an embodiment, CSS editor 324 may create a user defined filter providing a custom operation that modifies a URL in one of the links in a way that is relevant to a user, for example based on user attributes that are known by security awareness server 202. In an implementation, CSS filters may enable custom operations, for example swapping out a link with a different link in an advertisement. An example of a custom operation of a CSS filter is provided below. In the below example, "oldURL" refers to a link that was present in the advertisement and "newURL" refers to a simulated phishing link.

```
.link-swap {
    swap-link: swap(oldURL:newURL);
}
``` in some embodiments, ad/content editor 326 may be an application or a program that modifies advertisements and/or content in webpages and/or social media feeds. In an implementation, ad/content editor 326 may be configured to determine whether to replace advertisements and/or content, add advertisements and/or content, modify advertisements and/or content, and with what frequency they the advertisements and/or the content are to be replaced or modified. In an implementation, ad/content editor 326 may be configured to replace the advertisements and/or the content in the webpages and/or the social media feeds with the simulated phishing attack content. Ad/content editor 326 may retrieve the simulated phishing attack content from ad/content storage 322. In some implementations, ad/content editor 326 may retrieve the simulated phishing attack content from an Internet location or a server.

In some implementations, security awareness server 202 may determine whether to replace advertisements and/or content, add advertisements and/or content, modify advertisements and/or content, and with what frequency that the advertisements and/or the content are to be replaced or modified. Further, security awareness server 202 may communicate a determination result to ad/content editor 326. In an example, security awareness server 202 may determine/choose to not replace advertisements in a webpage, and instead add simulated phishing attack content without replacing or modifying an existing advertisement.

According to some embodiments, ad blocker 328 may be an application or a program that is configured to remove or alter online advertisements in a web browser or any other application. Ad blocker 328 may interchangeably be referred to as content blocker 328. In an implementation, ad blocker 328 may be a browser add-on, a plug-in, or a script that runs as a part of applications. In an implementation, ad blocker 328 may be a form of http:// interception whereby ad blocker 328 may remove/block one or more advertisement from a webpage or a social media feed, and then send the webpage or the social media feed to a user device of a user without the removed/blocked advertisements. Known examples of ad blocker 328 include AdGuard™.

Although it has been described that CSS editor 324, ad/content editor 326, and ad blocker 328 are components of proxy/edge server 204, in some embodiments, CSS editor 324, ad/content editor 326, and ad blocker 328 may be implemented within security awareness server 202 and/or user device 212-1. For example, CSS editor 324, ad/content editor 326, and ad blocker 328 may be implemented as plug-ins, add-ins, or extensions.

According to some embodiments, user device 212-1 may include processor 330-1 and memory 332-1. In an example, processor 330-1 and memory 332-1 of user device 212-1 may be CPU 121 and main memory 122, respectively, as shown in FIGS. 1C and 1D. User device 212-1 may also include user interface 334-1 such as a keyboard, a mouse, a touch screen, a haptic sensor, voice-based input unit, or any other appropriate user interface. It shall be appreciated that such components of user device 212-1 may correspond to similar components of computing device 100 in FIGS. 1C and 1D, such as keyboard 126, pointing device 127, I/O devices 130a-n and display devices 124a-n. User device 212-1 may also include display 336-1, such as a screen, a monitor connected to the device in any manner, or any other appropriate display. In an implementation, user device 212-1 may display received content (for example, webpages and social media feeds) for the user using display 336-1 and is able to accept user interaction via user interface 334-1 responsive to the displayed content.

Referring again to FIG. 3, in some embodiments, user device 212-1 may include threat reporting subsystem 338-1. In an implementation, threat reporting subsystem 338-1 may be an electronic system for receiving content that the user has reported as suspicious or likely to be malicious. Further, threat reporting subsystem 338-1 may host applications that provide additional and/or custom features to user device 212-1. Although, it is shown that threat reporting subsystem 338-1 is implemented in user device 212-1, in some embodiments, threat reporting subsystem 338-1 may be implemented in security awareness server 202.

According to some embodiments, user device 212-1 may include client-side web browser 340-1. In one example implementation, client-side web browser 340-1 may be a part of a web browser of user device 212-1. In an implementation, client-side web browser 340-1 may be configured to interpret markup languages such as HTML and CSS. Also, client-side web browser 340-1 may run scripts (for example, JavaScript) in a form of plug-ins, add-ins, extensions, or any other implementation. Client-side web browser 340-1 may include client-side plug-in 342-1. In some implementations, client-side plug-in 342-1 may not be implemented in client-side web browser 340-1 but may coordinate and communicate with client-side web browser 340-1. Further, in an implementation, client-side plug-in 342-1 may communicate with client-side web browser 340-1 over network 214.

In an example, when a user browses a website using client-side web browser 340-1, client-side web browser 340-1 may insert custom JavaScript for any webpage that matches a URL pattern. An example of JavaScript that may insert a "Scan Barcode" button in a webpage is given below.

```
// ==UserScript==
// @name Scan barcode into Half.com
// description Add button to Half.com search box to scan barcode
// @author Jeffrey Sharkey
// @includehttp://*m.half.com*
// ==/UserScript==
function generate(item) {
    var helper = document. createElement('input');
    helper.type = 'button';
    helper.value = 'Scan barcode...';
    helper.addEventListener('click', function(event) {
        // use the intentHelper bridge to fire an intent to Barcode Scanner
        // it's available in Market, or from http://code.google.eom/p/zxing/
        var result =
    window. intentHelper. startActivityForResult(JSON. stringify ({
            action:'com. google, zxing.client.android. SCAN',
            category:['CATEGORY DEFAULT']
        }));
    // parse the result we get back, and read the barcode from the extras
        result = JSON.parse(result);
        item.value = result['extras']['SCAN RESULT'];
    }, false);
    return helper;
}
// find the 'query' form field
var items = document.body.getElementsByTagName('input');
for(i in items) {
    var item = items[i];
    if(item.name == 'query') {
        // build our 'scan barcode' helper button
        // then insert it after the query form field
        var helper = generate(item);
        item.parentNode.insertBefore(helper, item.nextSibling);
    }
}
```

In some implementations, client-side plug-in 342-1 is an interface local to client-side web browser 340-1 that enables users, i.e., recipients of content, to select to report suspicious content that they believe may be a threat to them or their organization. Other implementations of client-side plug-in 342-1 not discussed here are contemplated herein. A client-side plug-in may be an application or program that may be added to a client-side web browser for providing one or more additional features to enable customization. The client-side plug-in may be provided by the same entity that provides the client-side web browser software, or may be provided by a different entity. In an example, client-side plug-in may include plug-ins providing a User Interface (UI) element such as a button to trigger a function. Functionality of client-side plug-ins that use a UI button may be triggered when a user clicks the button. Some examples of client-side plug-ins that use a button UI include, but are not limited to, a Phish Alert Button (PAB) plug-in, a task create plug-in, a spam marking plug-in, an instant message plug-in, a social media reporting plug-in and a search and highlight plug-in.

In an embodiment, client-side plug-in 342 may be any of the aforementioned types, or may be of any other type. In one example, client-side plug-in 342 may provide a PAB plug-in button through which functions or capabilities of client-side plug-in 342 are triggered/activated by a user action on the button. Upon activation, client-side plug-in 342-1 may forward content (for example, suspicious content) to a security administrator. In some embodiments, client-side plug-in 342-1 may cause client-side web browser 340-1 to forward content (suspicious webpage or social media feed) to threat reporting subsystem 338-1 or an Incident Response (IR) team of the organization for threat triage or threat identification. In some embodiments, client-side web browser 340-1 or client-side plug-in 342-1 may send a notification to security awareness server 202 that a user has reported content received at client-side web browser 340-1 as potentially malicious. Thus, the PAB plug-in button enables a user to report suspicious content.

According to some embodiments, user device 212-1 may include client-side social media application 344-1. Client-side social media application 344-1 may be a program or an application that may enable the user of user device 212-1 to access social media platforms, such as Facebook®, Twitter®, LinkedIn®, or other social media platforms.

In some embodiments, user device 212-1 may include user interaction manager 346-1. In an implementation, user interaction manager 346-1 may be an application or a program that monitors and reports a user interaction with an actionable element of a simulated phishing attack. Examples of the user interaction with an actionable element include clicking on a link, downloading an attachment, opening an attachment, clicking on a search result, clicking on an advertisement, hovering over the advertisement, forwarding a message, or any other action undertaken by the user in relation to the actionable element. The reporting of the user interaction may result in some action on user interface 334-1, such as a display of a pop-up or a landing page. In an example, a risk score of the user, a risk score of a group that the user is part of, a rosk score of an organization of the user, and a risk score of an industry to which the organization belongs, or a risk score of any other grouping that the user may be associated with may also be affected/impacted based on the user interaction. In an implementation, user interaction manager 346-1 may be a client-side part of the simulated phishing campaign manager 306.

According to some embodiments, security awareness server 202 may be configured to modify actual/existing/genuine advertisements in webpages or social media feeds with simulated phishing attack content, thus converting the actual/existing/genuine advertisements in the webpages or the social media feeds into simulated phishing attacks. In an example, the simulated phishing attack content may include an advertisement and/or other content (non-advertisement content). The simulated phishing attack content may include one or more simulated malicious interactive elements that are benign by nature. An example of a simulated malicious interactive element includes a URL. In an implementation, the webpages or the social media feeds may be modified based on HTTP request modification, CSS filtering, ad filtering, and script modification.

In operation, whenever a user of user device 212-1 wants to access a webpage or a social media feed, the user may make an HTTP request via user device 212-1 or access the social media application. In an example, the HTTP request may be made when the user enters a URL (or clicks on a link) of the webpage or the social media website on client-side web browser 340-1. In some examples, the user may access the social media feed by accessing the social media platform via client-side social media application 344-1. In an implementation, whenever the webpage or the social media feed is requested by the user, the HTTP request (or outbound HTTP request) may be sent from client-side web browser 340-1 or client-side social media application 344-1 to web hosting server 206 or social media server 208, respectively, via proxy/edge server 204. For the sake of brevity, web hosting server 206 and social media server 208 may be referred to as content server hereinafter. The webpage or the social media feed provided by web hosting server 206 and social media server 208, respectively, in response to the user's HTTP request may be referred to as content. In an example, the content may include one of the webpage or the social media feed.

In an implementation, when the user or the user's device makes the HTTP request, proxy/edge server 204 gets the request. Proxy/edge server 204 then passes on the HTTP request to the content server. On receiving the HTTP request, the content server may retrieve one or more advertisements from ad server 210. The content server may then populate/embed the one or more advertisements with the content, before the content is forwarded/returned to the user. Thereafter, the content server may return the content with the one or more advertisements embedded therein to proxy/edge server 204 for delivering the content to the user in response to the HTTP request. In an implementation, ad/content editor 326 may replace the one or more advertisements of the content with simulated phishing attack content.

Although, it has been described that when the user or the user's device makes the HTTP request, the HTTP request goes to the content server through proxy/edge server 204, in some embodiments, when the user or the user's device makes the HTTP request, the HTTP request may directly go to the content server without any involvement of proxy/edge server 204. In such scenarios, the content server may return the content with one or more advertisements. In an implementation, proxy/edge server 204 may intercept the content. Proxy/edge server 204 may then detect the one or more advertisements of the content and replace the one or more advertisements of the content with simulated phishing attack content.

According to some embodiments, when proxy/edge server 204 receives the content (i.e., the webpage or the social media feed that is to be forwarded to the requesting user) responsive to the request by user device 212-1, ad/content editor 326 may detect the one or more advertisements that are already inserted into the content, distinguishing these from other content.

In some embodiments, when the user or the user's device makes the HTTP request, proxy/edge server 204 intercepts the HTTP request instead of allowing the HTTP request to directly go to the content server where the requested content is hosted. In an implementation, ad/content editor 326 in proxy/edge server 204 may modify the HTTP request such that the content server returns only the content without any advertisement. In such scenarios, ad/content editor 326 may retrieve one or more advertisements from ad server 210 and embed the one or more advertisements into the requested content.

In an implementation, ad/content editor 326 may determine an advertisement of the one or more advertisements to modify to provide simulated phishing attack content. Further, in an implementation, ad/content editor 326 may modify the determined advertisement to include the simulated phishing attack content in a form of an advertisement. In some implementations, ad/content editor 326 may modify the determined advertisement to include the simulated phishing attack content in a form of a non-advertisement content. In some implementations, ad/content editor 326 may modify the content itself to include the simulated phishing attack content in a form of an advertisement or non-advertisement content. In an example implementation, the simulated phishing attack content may include one or more simulated malicious interactive elements. An example of a simulated malicious interactive element includes a URL.

In an implementation, the simulated phishing attack content may be provided by ad/content generator 308 to ad/content editor 326. In some implementations, ad/content editor 326 may retrieve the simulated phishing attack content from ad/content storage 322. According to an embodiment, ad/content editor 326 may modify/alter the advertisement (i.e., the genuine advertisement) in the content by replacing the advertisement with the simulated phishing attack content. Further, ad/content editor 326 may modify the advertisement to include one or more elements to pass through ad blocker 328.

In some embodiments, the content with the modified advertisement and the genuine advertisements is evaluated/examined by ad blocker 328 before being sent to the requesting user. In an implementation, ad blocker 328 may recognize the modified advertisement and the genuine advertisements in the content, and block or remove some of the genuine advertisements from the content. According to an implementation, proxy/edge server 204 may forward the content with advertisements (genuine advertisements and/or modified advertisement) that may not have been detected by ad blocker 328 to the requesting user. In an example implementation, proxy/edge server 204 may forward the content with the modified advertisement and/or genuine advertisement to user device 212-1 responsive to the request by the user.

According to some embodiments, when the content is received at user device 212-1, user interaction manager 346-1 may track an action by the user with respect to the modified advertisement. In an example, on receiving the content with modified advertisement, the user may interact with the modified advertisement. For example, the user may click on a link included in the modified advertisement, hover over the link, and copy the link, and paste it into client-side web browser 340-1.

According to an embodiment, if the user interacts with the simulated phishing attack (i.e., the modified advertisement) in any way, the user may be traversed to (or presented with) a specific landing page to provide description of one of a security exploit or the action by the user with respect to the modified advertisement. For example, the user may be traversed to the landing page when the user clicks on a link or a search result in the modified advertisement. The landing page may alert the user that the user has failed a simulated phishing attack and provide general or specific learning materials to the user. In an example, the user may be provided with "training on the spot" or "training in the moment" on how to avoid such an attack in future. In some embodiments, if the user interacts with modified advertisement in any way, the user may be traversed to (or presented with) training content to provide description of one of a security exploit or the action taken by the user with respect to the modified advertisement. In an implementation, the organization may want to evaluate if a user device (for example, user device 212-1) is at risk of being a breach entry point. In such scenarios, security awareness server 202 may only maintain internal metrics, for example to determine if a user is trustworthy with the user device provided by the organization and not train the user, thereby decoupling the training from the testing. In an example, the landing page may not provide description of the simulated phishing attack or the security exploit. In an example, client-side web browser 340-1 may display a "404-page not found error" or some other error. In such cases, the user would be of the opinion that there may be some technical error because of which the page was not displayed, and the user would not get to know that he or she has fallen for the simulated phishing attack.

In an example, the landing page (also referred to as destination page) may be any mechanism by which a user is provided a training that is relevant to the specific phishing attack. In an example, the landing page may be a webpage which enables provisioning of training materials. In some examples, the landing page may be a pop-up message. A pop-up message shall be understood to refer to the appearance of graphical or textual content on a display. In an example, the landing page may include fixed content or dynamic content. The dynamic content may be understood as content that may be modified based on which user the landing page is presented to. For example, the landing page may be customized based on a name of the user, an email address of the user, or other content that is specific or relevant to the user. In some examples, the training material or the learning material may be presented on the display as part of, or bounded within, a "window" or a user interface element or a dialog box. Although other known examples and implementations of landing pages are contemplated herein, these need not be described in full within this disclosure for the sake of brevity. In an example, the landing page may be designed and configured to communicate any one or more user interactions or related events to security awareness server 202 for data collection/record. In some implementations, security awareness server 202 may not always traverse a user to a landing page upon the user interaction with a simulated phishing attack, as this would immediately reveal the attack vector to the user, who may then share this with other users. This may prevent the organization from evaluating a response of each user with respect to the simulated phishing attack.

In some implementations, the interaction of the user with the simulated phishing attack may be associated with the user's device i.e., user device 212-1 instead of the user himself or herself. For example, the user interaction may be associated with a Media Access Control (MAC) address of user device 212-1. In an example, the user may be associated with the MAC address in order to provide training to the correct user and to adjust risk scores appropriately. There are different ways that the MAC address of user device 212-1 can be associated with the user of user device 212-1 at the time of the user interaction. For example, the user of user device 212-1 at the time of the user interaction may be determined based on an active or logged in user on user device 212-1 at that time (for example, in the case where user device 212-1 may have multiple user profiles). In scenarios where the access is done through a social media application, account holder detail which would be available once the user has logged in may be used to associate the user with user device 212-1 where the user interaction is performed. For example, if the user logs into Facebook®, an identity of the user may be determined based on determining a name of the user on the Facebook® account. For an organization-owned device, the user identity may be determined based on organizational assignment of the organization-owned device to a specific user. In some circumstances, an IP address can be associated with a MAC address, for example for a duration of a log in session on an organization-owned device.

In some implementations, risk score calculator 310 may determine/establish a risk score of the user based at least on the action by the user with respect to the modified advertisement. In an example, risk score calculator 310 may determine the risk score of the user based on an action by the user such as user interaction with the modified advertisement and/or based on how the user interacted with the modified advertisement. A risk score of a user quantifies a cybersecurity risk that the user poses to an organization. In other words, a risk score of a user may be a representation of vulnerability of the user to a malicious attack. In one example, a user with a higher risk score may present a greater risk to the organization and a user with a lower risk score may present a lower risk to the organization.

In some embodiments, on receiving the content with a modified advertisement, if the user suspects that the content and/or the modified advertisement is potentially malicious, then the user may report the content and/or the modified advertisement using client-side plug-in 342-1 of user device 212-1. In an implementation, client-side plug-in 342-1 may provide a UI element such as the PAB in client-side web browser 340-1. In an example, when the user receives the content with modified advertisement and the user suspects that the modified advertisement is potentially malicious, then the user may click on the UI element such as a button using, for example, a mouse pointer to report the modified advertisement. In some implementations, when the user selects to report, via the UI element, the content with modified advertisement, client-side plug-in 342-1 may receive an indication that the user has reported the modified advertisement received at client-side web browser 340-1. In response to receiving the indication that the user has reported the modified advertisement, client-side plug-in 342-1 may cause client-side web browser 340-1 to forward the modified advertisement (suspicious advertisement) to threat reporting subsystem 338-1 or to a security awareness administrator or to an Incident Response (IR) team that is responsible for threat triage or threat identification.

In some implementations, some or all of the functions performed by proxy/edge server 204 including, but not limited to, detecting the one or more advertisements within the content, determining an advertisement of the one or more advertisements to modify to provide simulated phishing attack content, and modifying the advertisement to include the simulated phishing attack content may be performed by security awareness server 202 or user device 212-1. In an implementation, security awareness server 202 may intercept the content prior to presenting the content via user device 212-1 to the user. In an example, security awareness server 202 may intercept/access the content at proxy/edge server 204 requested from user device 212-1. For example, security awareness server 202 may receive the requested content (i.e., the webpage or the social media feed) with inserted genuine advertisements.

In an implementation, security awareness server 202 or simulated phishing campaign manager 306 may be configured to modify the webpages or the social media feeds according to different criteria. In an example, the criteria may be set by a system administrator of the organization as a part of a simulated phishing campaign configuration. In some examples, the criteria could also be set by Artificial Intelligence (AI) techniques or Machine Leaning (ML) techniques. In an example, the webpages or the social media feeds may be modified based on periodicity (a regular interval). For example, simulated phishing campaign manager 306 may replace or modify every one out of five advertisements, or a percentage of advertisements, and simulated phishing attacks are created by adding to the webpage or social media feed. In some implementations, no advertisements are replaced or modified, instead other content may be modified. A periodicity or interval of advertisement/content replacement could be determined by a difficulty rating for the simulated phishing campaign.

In an example, the simulated phishing attack content may be related to or be created based on a template. For example, choosing advertisements to be modified into simulated phishing attacks as part of a simulated phishing attack campaign may be specified by a template, such that the advertisements chosen for modification or the content the advertisements are modified with are within the same category or dealing with the same subject matter. The simulated phishing attack content used for simulated phishing attacks may be determined by user attributes such as user risk score of a user associated with the device, or attributes such as user location, seniority, tenure with the organization, or other attribites associated with the user. The advertisements may be tailored to specific users based on these attributes. The content and/or advertisements to modify may be associated with users or user groups that the simulated phishing attacks are sent to. For example, simulated phishing attack campaigns targeting a user in an 'accounting' group may utilize advertisements that are particularly relevant to accountants. Additionally, or alternatively, the content may include an urgent call to action to try and convince the user to act quickly. For example, the content may say "New local law goes into effect tomorrow. Click here to sign a petition TONIGHT!"

The content of the advertisements may be modified such that there are flags or determinants that a user should recognize (or could be taught to recognize) in order to realize that they should not interact with the advertisement. Examples of modifying content in an advertisement include changing the look of the replaced advertisement by changing colors of the advertisement or adding big, bright buttons, or changing the text or graphics of an advertisement, or changing the position of an advertisement on the webpage or the social media feed.

Figure 4A:
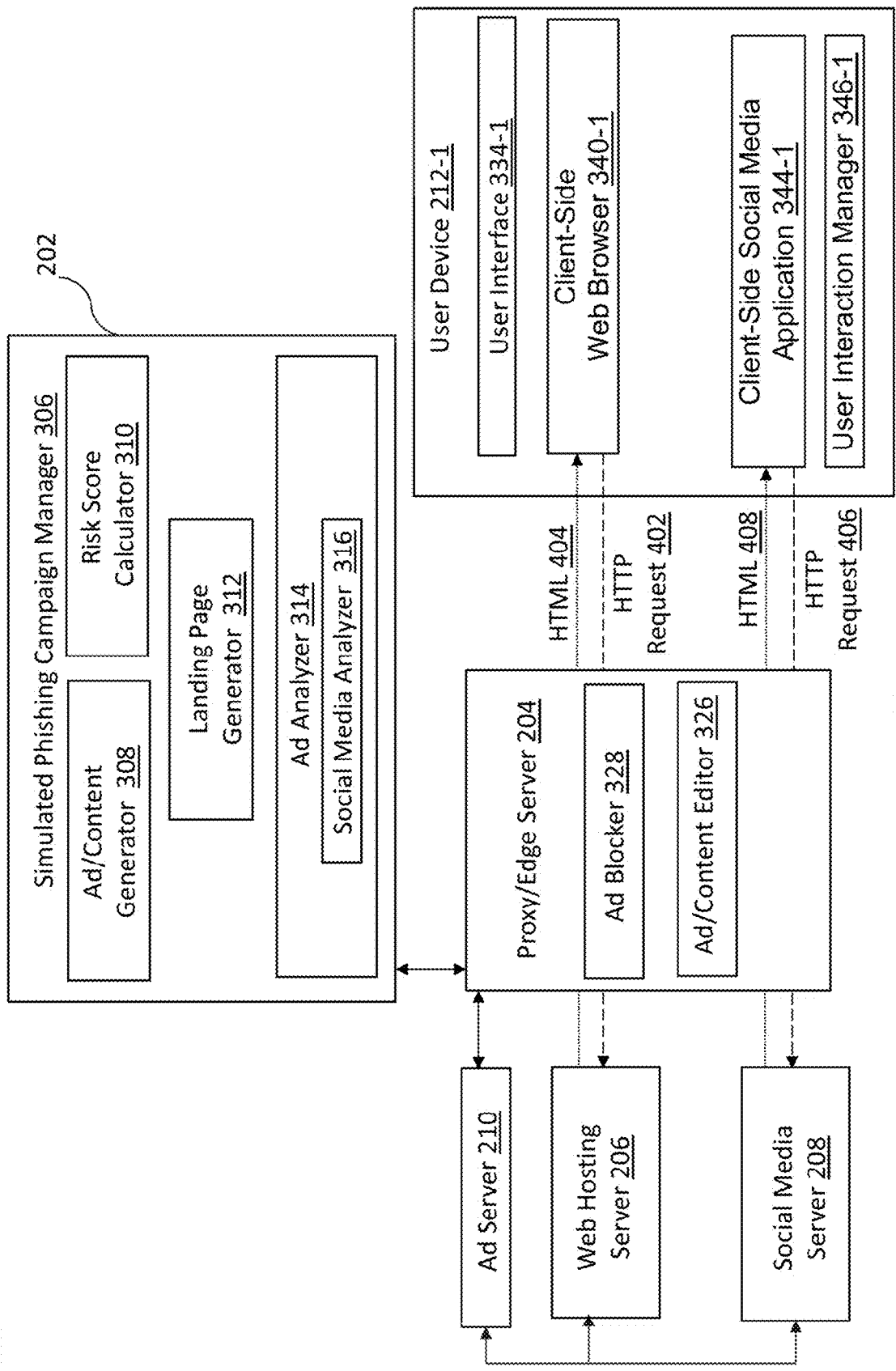
FIGS. 4A and 4B are illustrations of insertion of advertisements and/or content in a webpage or a social media feed, according to some embodiments.
Figure 4B:
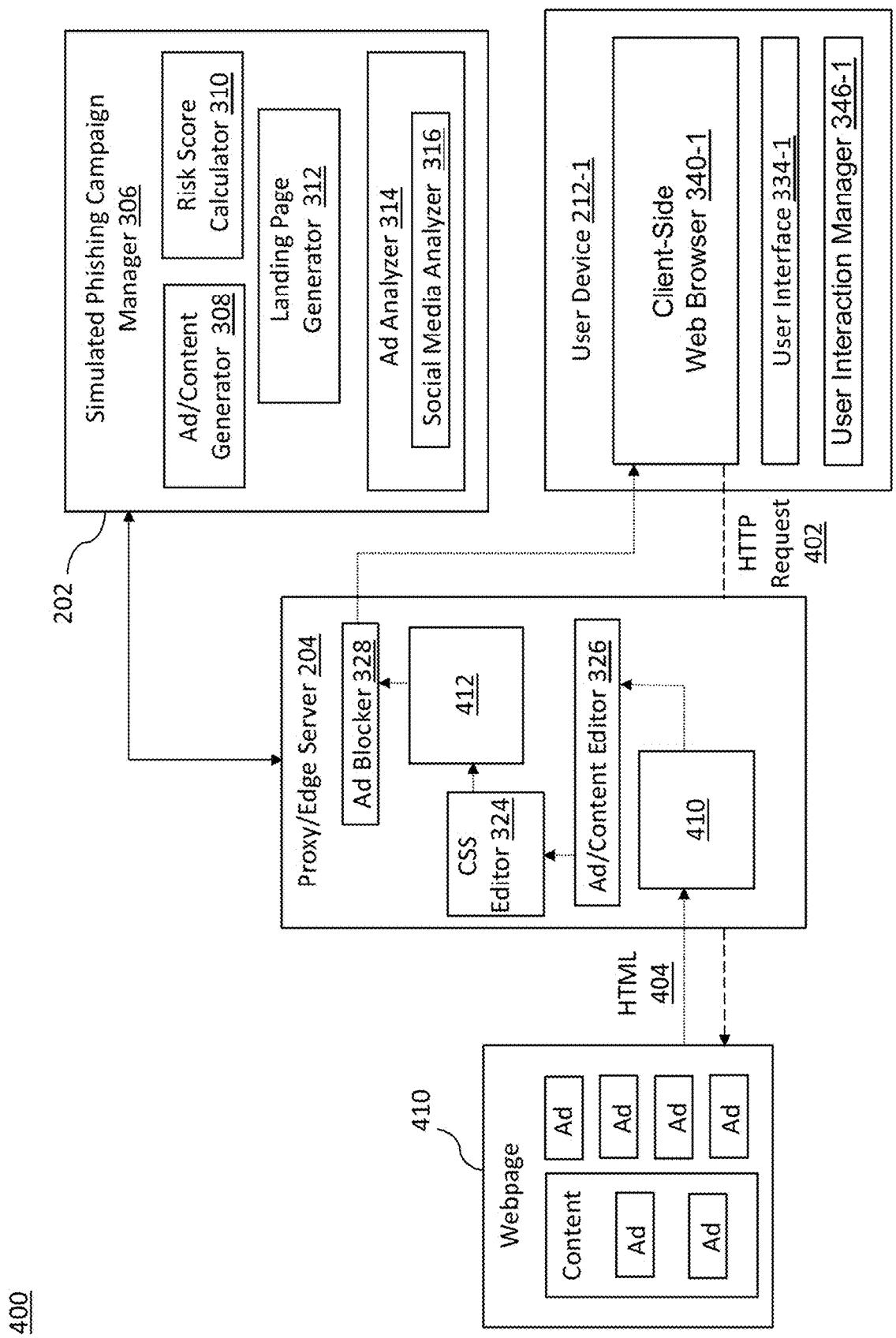

FIGS. 4A and 4B are illustrations 400 of insertion of advertisements and/or content in a webpage or a social media feed, according to some embodiments.

According to some embodiments, whenever a user of user device 212-1 wants to access a webpage of a website, the user may send a request via client-side web browser 340-1. In an implementation, when the webpage is requested by the user or a user device 212-1, a HTTP request 402 is sent from client-side web browser 340-1 to web hosting server 206 via proxy/edge server 204. In an implementation, HTTP request 402 may be sent to an internet address, such as a Uniform Resource Locator (URL) associated with web hosting server 206, requesting the webpage. In response to HTTP request 402, web hosting server 206 may return the webpage to the user using HTML 404 of the webpage. In an implementation, before returning the webpage to the user, web hosting server 206 may insert/embed one or more advertisements and other content (such as non-advertisement content) into the webpage. In an implementation, web hosting server 206 may retrieve the one or more advertisements and the other content from ad server 210. Web hosting server 206 may embed the one or more advertisements and the other content in different ways.

In an implementation, web hosting server 206 may return HTML 404 of the webpage to client-side web browser 340-1 via proxy/edge server 204. For example, the HTML 404 of the webpage is first sent to proxy/edge server 204, and then proxy/edge server 204 forwards HTML 404 of the webpage to client-side web browser 340-1 of user device 212-1 of the user. Further, the webpage received by proxy/edge server 204 may include the one or more advertisements and the other content (such as non-advertisement content) already embedded into it.

According to an embodiment, when HTML 404 of the webpage is returned to proxy/edge server 204, ad/content editor 326 of proxy/edge server 204 may modify the one or more advertisements (genuine advertisements) and/or the other content of the webpage before rendering the webpage to the user. In an implementation, proxy/edge server 204 may forward the webpage with modified advertisements and/or the other content to user device 212-1 responsive to HTTP request 402 by the user. In an example, the webpage received by the user may include a modified advertisement and at least one genuine advertisement.

On receiving the webpage, the user may interact with the webpage via user interface 334-1. For example, the user may scroll through the webpage to view content of the webpage. In an example, the webpage may include one or more hyperlinks through which additional webpages may be accessed. The user may click on these hyperlinks to request additional webpages. In an example, user interaction manager 346-1 of user device 212-1 may monitor and report an interaction of the user with the modified one or more advertisements and/or the other content of the webpage.

In some embodiments, the user may also access a social media feed of a social media website in a similar way as described above for the webpage. Whenever the user wants to access the social media feed, the user may send a request via client-side social media application 344-1. In an implementation, when the social media feed is requested by the user, a HTTP request 406 is sent from client-side social media application 344-1 to social media server 208 via proxy/edge server 204. In response to HTTP request 406, social media server 208 may return the social media feed to the user using HTML 408 of the social media feed. When responding to HTTP request 406 from the user, social media server 208 may insert/embed one or more advertisements and other content in the social media feed. In an implementation, the social media server 208 may retrieve the one or more advertisements and the other content from ad server 210. HTML 408 of the social media feed may be sent to client-side social media application 344-1 via proxy/edge server 204 and the social media feed may be rendered to the user.

Although it has been described that the one or more advertisements and the other content are inserted/embedded into the webpage and the social media feed by web hosting server 206 and social media server 208, in some implementations, the one or more advertisements and the other content may be embedded into the webpage and the social media feed by proxy/edge server 204. In an example, the webpage and the social media feed received by proxy/edge server 204 may be a webpage template and a social media feed template, respectively, that may include placeholders for advertisements and content. On receiving the webpage (i.e., the webpage template) proxy/edge server 204 may retrieve the one or more advertisements and the other content from ad server 210, and may insert the one or more advertisements and the other content into the placeholders for the advertisements and the content. The manner in which the one or more advertisements of the webpage are modified to create a simulated phishing attack is explained in conjunction with FIG. 4B.

FIG. 4B is a continuation of FIG. 4A. Per FIG. 4B, the user of the organization makes HTTP request 402 for webpage 410 using client-side web browser 340-1. In response to HTTP request 402, HTML 404 for the webpage 410 is sent to the client-side web browser 340-1 via proxy/edge server 204. As can be seen in FIG. 4B, ad/content editor 326, CSS editor 324, and ad blocker 328 are embedded in proxy/edge server 204. Further, webpage 410 that arrives at proxy/edge server 204 includes content (non-advertisement content) and/or advertisements already embedded therein. At this point, ad/content editor 326 may examine the content and/or the advertisements embedded into webpage 410. Based on the examination, ad/content editor 326 may determine whether some of the existing advertisements and/or content of webpage 410 should be modified to include simulated phishing attack content, thereby creating a simulated phishing attack.

In some embodiments, ad/content editor 326 may retrieve the simulated phishing attack content generated by ad/content generator 308. In an implementation, ad/content generator 308 may interface directly with ad/content editor 326 to provide the simulated phishing attack content. The simulated phishing attack content may include a new advertisement and/or new content. In an implementation, ad/content editor 326 may modify the existing advertisements by replacing the existing advertisements with the new advertisement and/or the new content (simulated phishing attack content). In some implementations, ad/content editor 326 may insert the new advertisement created by ad/content generator 308, rather than modify an advertisement that is already embedded in webpage 410. In some implementations, ad/content editor 326 may edit the non-advertisement content of the webpage 410, for example to make webpage 410 more relevant or interesting to the receiving user by incorporating context that is user specific. Resulting webpage 412 includes a combination of existing advertisements and content and modified or new advertisements and content.

In an implementation, proxy/edge server 204 may forward/deliver resulting webpage 412 to the user via client-side web browser 340-1 of user device 212-1. In some implementations, before resulting webpage 412 is delivered to the user, resulting webpage 412 is passed through ad blocker 328 which is enabled to provide extra system security measures. In an implementation, ad blocker 328 may remove advertisements from resulting webpage 412 that it considers to be a threat before forwarding resulting webpage 412 to the user via client-side web browser 340-1. In an implementation, ad blocker 328 may remove an advertisement if the advertisement is a malicious advertisement. In an example implementation, ad blocker 328 may determine if an advertisement is a malicious advertisement based on pre-determined criteria. For example, if the advertisement matches the pre-determined criteria, then it may be determined that the advertisement is a malicious advertisement. Likewise, a social media feed may be requested by the user and the social media feed may be modified to include simulated phishing attack content, thereby creating a simulated phishing attack in the advertisements of the social media feed. Although it has been shown in FIGS. 4A and 4B that ad blocker 328 is implemented in proxy/edge server 204, in some implementations, ad blocker 328 may be implemented in user device 212-1.

Figure 5:
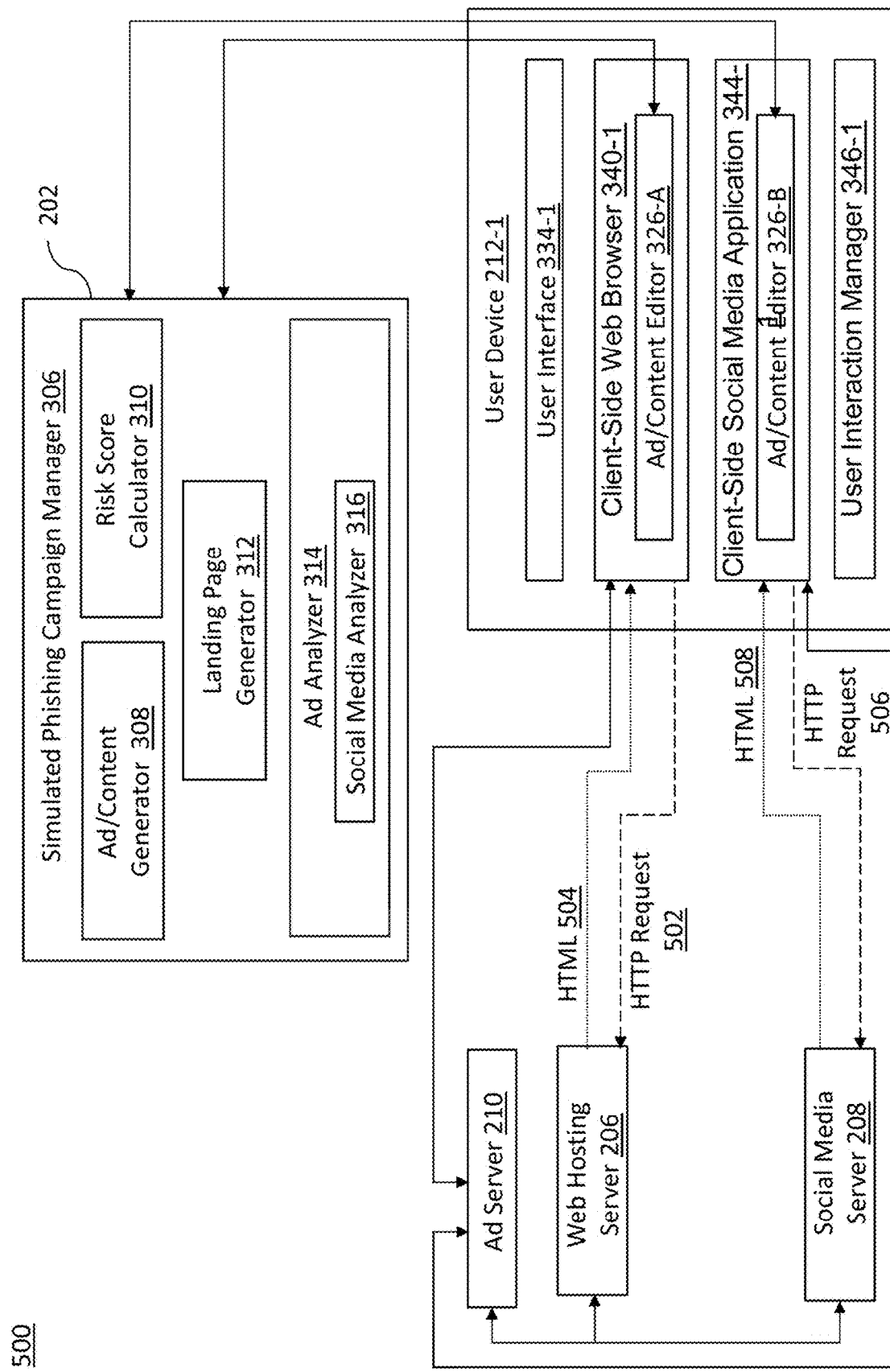
FIG. 5 is an illustration of insertion of advertisements and/or content in a webpage or a social media feed, according to some embodiments.

FIG. 5 is an illustration 500 of insertion of advertisements and/or content in a webpage or a social media feed, according to some embodiments. In some embodiments, proxy/edge server 204 may not be present between user device 212-2 and web hosting server 206 and social media server 208, and HTTP requests may be sent directly from user device 212-1 to web hosting server 206 and social media server 208. As can be seen in FIG. 5, when a webpage is requested by the user, a HTTP request 502 is sent from user device 212-1 (via client-side web browser 340-1) directly to web hosting server 206. In response to HTTP request 502, web hosting server 206 may return the webpage to user device 212-1 using HTML 504 of the webpage. When the social media feed is requested by the user, a HTTP request 506 is sent from user device 212-1 (via client-side social media application 344-1) directly to social media server 208. In response to HTTP request 506, social media server 208 may return the social media feed to user device 212-1 using HTML 508 of the social media feed. In some implementations, HTTP requests 502 and 504 may be similar to corresponding HTTP requests 402 and 404. Further, HTML 506 and 508 may be similar as corresponding HTTP requests 406 and 408.

In an implementation, client-side web browser 340-1 may include ad/content editor 326-A and client-side social media application 344-1 may include ad/content editor 326-B. Ad/content editor 326-A and ad/content editor 326-B may be instances of ad/content editor 326. In an example, ad/content editor 326-A and ad/content editor 326-B may be implemented as plug-ins, add-ins, extensions or any other implementation. In an implementation, security awareness server 202 may install ad/content editor 326-A and ad/content editor 326-B in client-side web browser 340-1 and client-side social media application 344-1, respectively.

In an embodiment, the returned webpage may include advertisements and/or other content. In some embodiments, the returned webpage may not include embedded advertisements and/or other content. In such scenarios, ad/content editor 326-A may embed advertisements and/or other content into the returned webpage before the webpage is displayed to the user. In an implementation, ad/content editor 326-A may retrieve the advertisements and/or the other content to be embedded into the returned webpage from ad server 210.

Further, in an embodiment, the returned social media feed may include advertisements and/or other content. In some embodiments, the returned social media feed may not include embedded advertisements and/or other content. In such scenarios, ad/content editor 326-B may embed advertisements and/or other content into the returned social media feed before the social media feed is displayed to the user. In an implementation, ad/content editor 326-B may retrieve the advertisements and/or the other content to be embedded into the returned social media feed from ad server 210.

According to an embodiment, ad/content editor 326-A may modify the advertisements and/or the other content of the webpage before rendering the webpage to the user. Further, ad/content editor 326-B may modify the advertisements and/or the other content of the social media feed before rendering the social media feed to the user.

Figure 6:
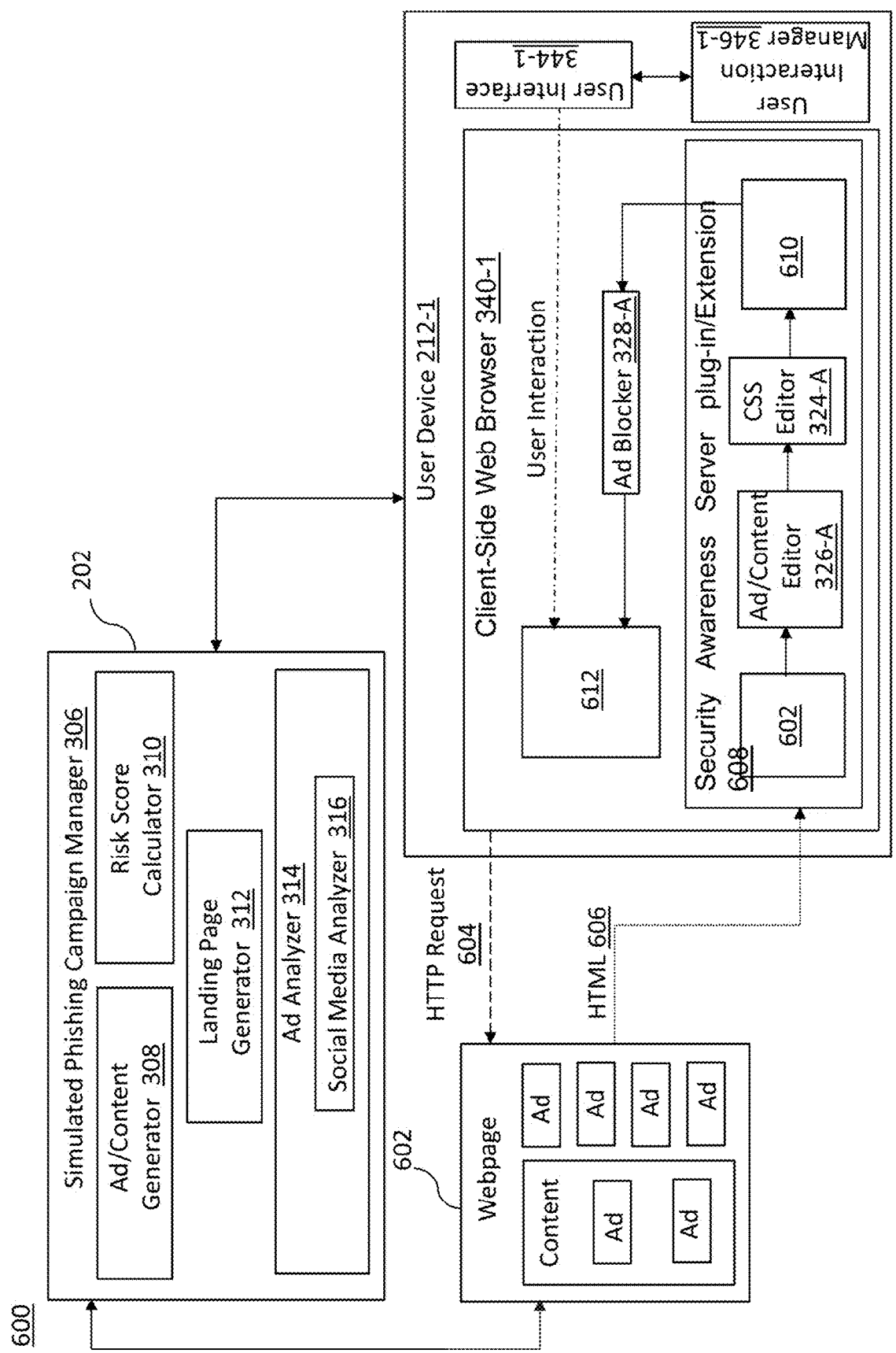
FIG. 6 is an illustration of performing a simulated phishing attack using the webpage having advertisements and/or content, according to some embodiments.

FIG. 6 is an illustration 600 of performing a simulated phishing attack using the webpage having advertisements and/or content, according to some embodiments. The user of user device 212-1 makes a request for webpage 602 using client-side web browser 340-1. Webpage 602 is generated with content (non-advertisement content) and/or advertisements. As shown in FIG. 6. the user makes an HTTP request 604 and in response to HTTP request 604, HTML 606 for webpage 602 is sent to client-side web browser 340-1 of user device 212-1. Client-side web browser 340-1 includes a security awareness server plug-in/extension 608 and ad blocker 328-A. Further, security awareness server plug-in/extension 608 includes ad/content editor 326-A and CSS editor 324-A, both of which are instances of proxy/edge server.

In an implementation, when webpage 602 is received at client-side web browser 340-1, ad/content editor 326-A examines the content and/or the advertisements of webpage 602 and determines whether some of the existing content and/or the advertisements should be modified to include simulated phishing attack content, thereby creating a simulated phishing attack.

In some embodiments, ad/content editor 326-A may insert a new advertisement (created by ad/content generator 308) in webpage 602 instead of modifying an existing advertisement of webpage 602. In an implementation, ad/content editor 326-A may also modify the non-advertisement content of webpage 602, for example to make the webpage 602 more relevant or interesting to the receiving user by incorporating context that is user-specific. Further, CSS editor 324-A may process webpage 602 to provide a blurring effect or a color shifting effect in webpage 602. Resulting webpage 610 or modified webpage 610 includes a combination of existing advertisements and content and modified or new advertisement and content. In an implementation, as described above, ad/content generator 308 may utilize social media analyzer 316 to determine which code constructions for advertisements and content are least likely to get caught by ad blocker 328. Similar constructions may be implemented by ad/content editor 326-A. Modified webpage 610 is then analyzed by ad blocker 328-A. In an implementation, ad blocker 328-A may remove advertisements from modified webpage 610 that it considers to be a threat before forwarding resulting webpage 612 to the user.

Figure 7:
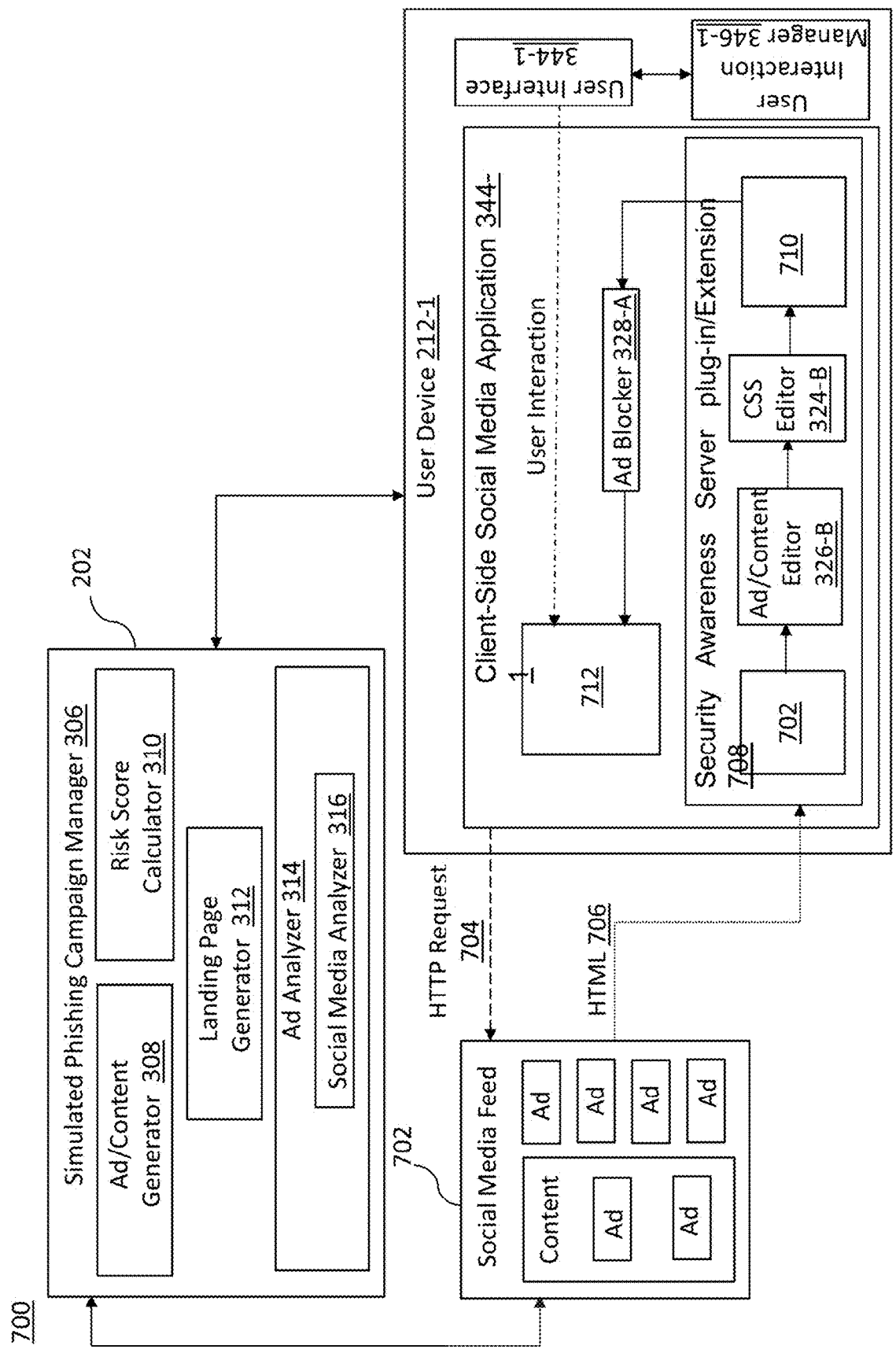
FIG. 7 is an illustration of performing a simulated phishing attack using the social media feed having advertisements and/or content, according to some embodiments.

FIG. 7 is an illustration 700 of performing a simulated phishing attack using the social media feed having advertisements and/or content, according to some embodiments.

The user of user device 212-1 makes a request for social media feed 702 using client-side social media application 344-1. Social media feed 702 is generated with content (non-advertisement content) and/or advertisements. As shown in FIG. 7, the user makes an HTTP request 704 and in response to HTTP request 704, HTML 706 for webpage 702 is sent to client-side social media application 344-1 of user device 212-1. Client-side social media application 344-1 includes a security awareness server plug-in/extension 708 and ad blocker 328-B. Further, security awareness server plug-in/extension 708 includes ad/content editor 326-B and CSS editor 324-B, both of which are instances of proxy/edge server.

In an implementation, when social media feed 702 is received at client-side social media application 344-1, ad/content editor 326-B examines the content and/or the advertisements of social media feed 702 and determines whether some of the existing content and/or the advertisements should be modified to include simulated phishing attack content, thereby creating a simulated phishing attack.

In some embodiments, ad/content editor 326-B may insert a new advertisement, created by ad/content generator 308 in social media feed 702 instead of modifying an existing advertisement of social media feed 702. In an implementation, ad/content editor 326-B may also modify the non-advertisement content of social media feed 702, for example to make the social media feed 702 more relevant or interesting to the receiving user by incorporating context that is user-specific. Resulting social media feed 710 or modified social media feed 710 includes a combination of existing advertisements and content and modified or new advertisement and content. Modified social media feed 710 is then analyzed by ad blocker 328-B.

In some embodiments, ad blocker 328-B may regularly update ad blocker descriptions so that ad blocker 328-B is most effective in blocking advertisements. As a result of the regular updating process, some advertisements that may have previously passed through ad blocker 328-B may at some point be removed by ad blocker 328-B. As digital advertisement revenue is essential for social media platforms, the social media platforms closely analyze which advertisement get through ad blocker 328-B and which advertisements do not get through ad blocker 328-B. Based on the analysis, the social media platforms regularly make changes to their advertisements.

In some implementations, the social media platforms (or advertisers) need to frequently change ad scripts of their advertisements to avoid having their advertisements modified or replaced by ad blocker 328-B. In some embodiments, social media analyzer 316 of security awareness server 202 may detect/monitor frequently changing elements in advertisements on webpages and social media feeds when all or most other content on the webpages and the social media feeds is static. Monitoring for these changes enables social media analyzer 316 to learn about the changing elements to avoid blocking of advertisements as social media analyzer 316 may implement the changes in advertisements.

In an implementation, social media analyzer 316 may track the changes that social media platforms make to encoding of advertisements that social media platforms include in social media feeds in order to rapidly detect changes made by social media platforms to ensure that the advertisements do not get stopped/blocked by ad blocker 328-B.

Figure 8:
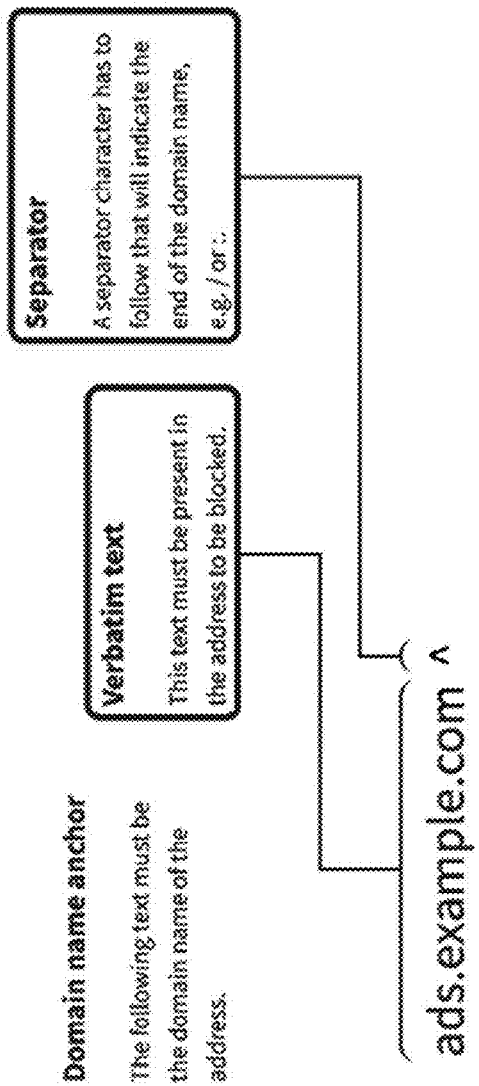
FIG. 8 is an illustration of specific patterns that may appear in advertisements.

In an implementation, social media analyzer 316 may emulate the detected changes in the simulated phishing attack content. Social media analyzer 316-B may also notify ad/content editor 326-B about these changes so that ad/content editor 346-B make these changes in the advertisements and/or the other content that are to be included in social media feed 702. Accordingly, the advertisements and/or the other content may make it past ad-blocker 328-B. In an implementation, social media analyzer 316 may look for specific patterns in advertisements as illustrated in FIG. 8.

In an implementation, social media analyzer 316 may leverage ad blocker 328-B to learn how ad blocker 328-B changes its descriptions and filters. Social media analyzer 316 may leverage this learning to facilitate the creation/modification of advertisements and creation of simulated phishing attack content that will not be blocked by ad blocker 328-B. Accordingly, when social media feed 710 is analyzed by ad blocker 328-B, ad blocker 328-B may remove advertisements from modified social media feed 710 that it considers to be a threat and does not remove the simulated phishing attack content before forwarding resulting social media feed 612 to the user.

Figure 9:
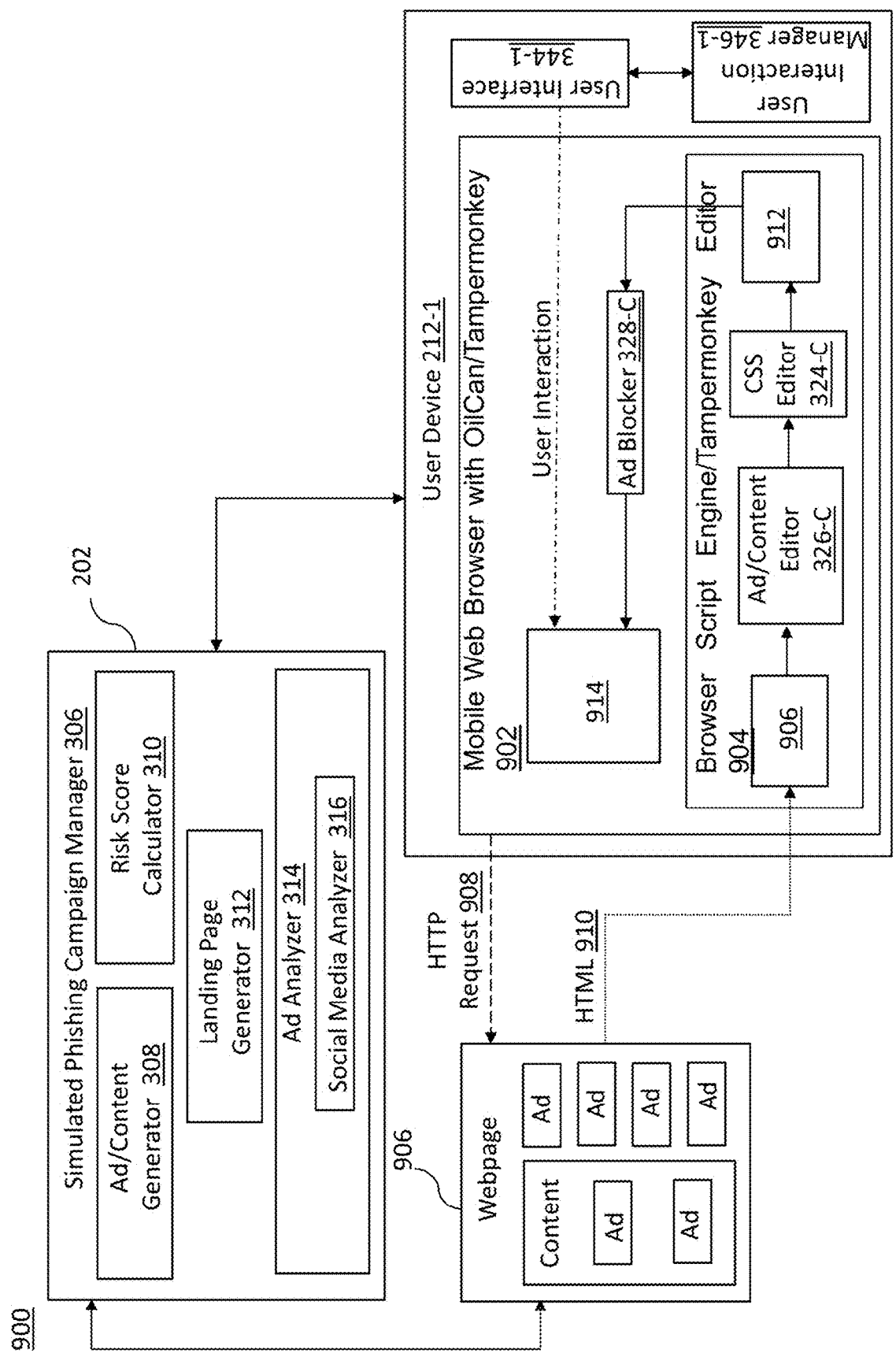
FIG. 9 is an illustration of performing a simulated phishing attack for a mobile web browser, according to some embodiments.

FIG. 9 is an illustration 900 of performing a simulated phishing attack for a mobile web browser, according to some embodiments. In a user device, such as a mobile device, an application "WebKit™" or any other appropriate application may be integrated or may function in cooperation with a mobile web browser. In an example, the mobile web browser having the application "WebKit™" integrated therein may be referred to as WebKit' browser. In an example, "Oil- Can™" enables customization of any website, such as an Android website by inserting JavaScript into the website. In an example, "OilCan™" may be used to insert buttons into websites using "Android intents", change the way content is displayed on the websites, or otherwise modify how the web site is presented to the user. In an example, "OilCan™" is a thin layer on the WebKit™ browser that comes with Android. In other examples, user scripts may be used, for example to hide navigation columns in a website, such as Wikipedia® to make it easier to view on small screens. This functionality may be enabled as a binary plugin for a client-side web browser. Tampermonkey® is a user script manager extension for Android, Chrome, Chromium, Edge, Firefox, Opera, Safari, and other similar web browsers. Tampermonkey® may also be implemented as a standalone user script enabled web browser for Android mobile devices. An example of a version of Tampermonkey® may be a Beta release version.

As illustrated in FIG. 9, an application may be downloaded on user device 212-1 or a specific web browser may be downloaded that may enable security awareness server 202 to modify webpages or social media feeds, for example via a plug-in/extension or a WebKit'. An example of this would be a customized enterprise browser that a user has to download and use on user device 212-1 which may be allowed to access an organization network. In an implementation, a browser that can run scripts may be modified to provide security awareness server 202 access to modify the webpages. Further, a browser extension or a plug-in may be downloaded to and deployed on a browser on user device 212-1. In an example, a deployed extension/plug-in running on a client-side web browser or browser application on user device 212-1 may run scripts that serve the function of ad/content editor 326 described previously. As an example, for Firefox™ ad/content editor 326 may customize the way a webpage is displayed or behaves by using JavaScript. In an example, a greasemonkey extension may allow this customization and also enables new and unique user scripts.

As shown in FIG. 9, user device 212-1 includes mobile web browser with OilCan/Tampermonkey 902. Further, mobile web browser with OilCan/Tampermonkey 902 includes browser script engine/Tampermonkey editor 904 and ad blocker 328-C. Further, browser script engine/Tampermonkey editor 904 includes ad/content editor 326-C and CSS editor 324-C.

According to some embodiments, when a webpage 906 is requested by the user, HTTP request 908 is sent from user device 212-1 (via mobile web browser with OilCan/Tampermonkey 902). In response to HTTP request 906, webpage 906 is returned to user device 212-1 using HTML 910 of the webpage 906. In an embodiment, the returned webpage 910 may include advertisements and/or other content. According to an embodiment, ad/content editor 326-B may modify the advertisements and/or the other content of webpage 910 by inserting simulated phishing attack content in webpage 910 before rendering webpage 910 to the user. Further, ad/content editor 326-B may modify the advertisements and/or the other content of the social media feed before rendering the social media feed to the user. Modified webpage 912 is then analyzed by ad blocker 328-C. In an implementation, ad blocker 328-C may remove advertisements from modified webpage 912 that it considers to be a threat before forwarding resulting webpage 914 to the user.

Figure 10:
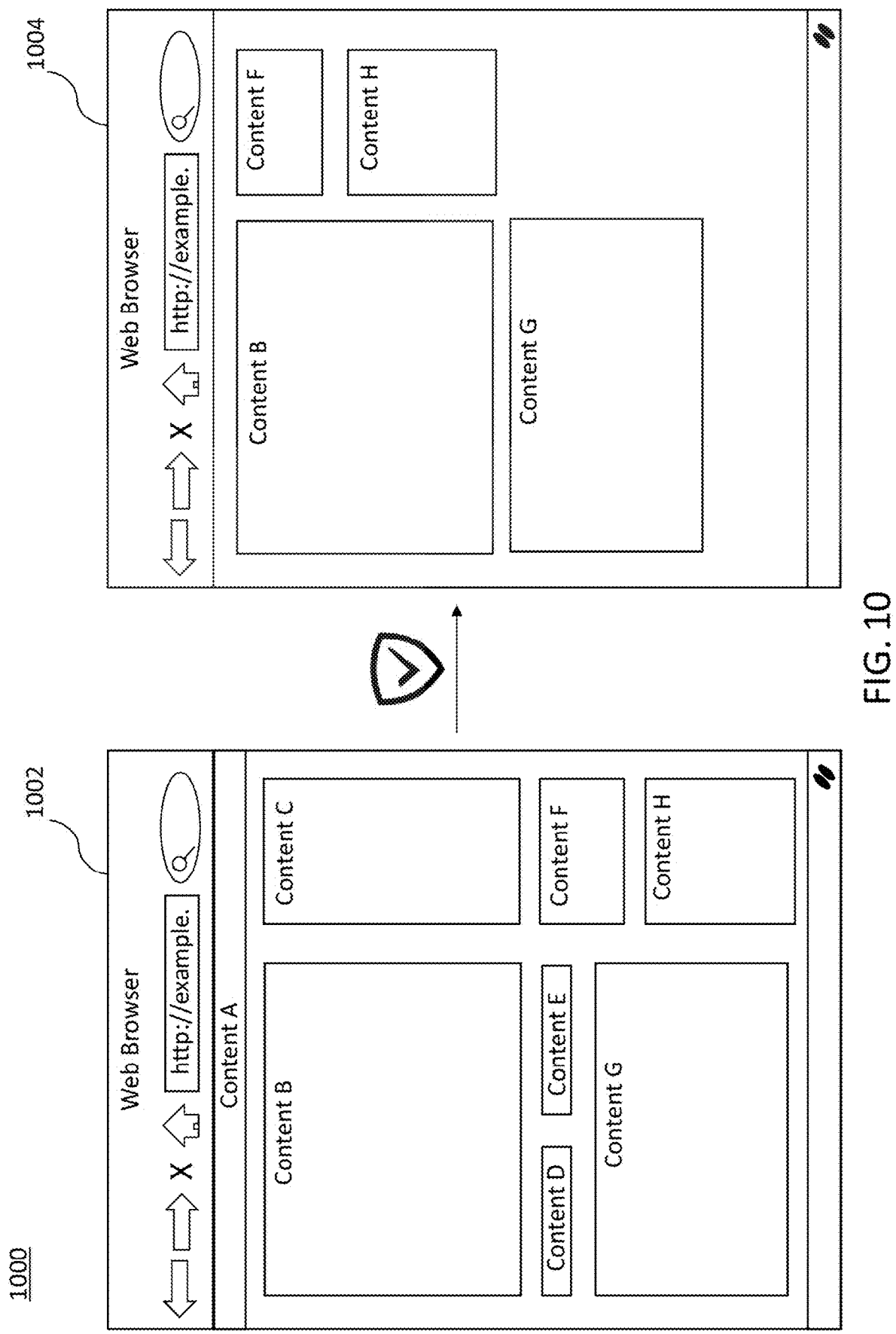
FIG. 10 is an illustration of filtering elements from the webpage having advertisements and/or content, according to some embodiments.

FIG. 10 is an illustration 900 of filtering elements from the webpage having advertisements and/or content, according to some embodiments. In an embodiment, the ad filtering mechanism for browser extensions relies on capabilities that browsers provide them with. An example of a known browser extension that can be used for ad filtering is AdGuard™. In an example, AdGuard™ is capable of performing page code filtering, as shown in FIG. 10.

Before a webpage is loaded into client-side web browser 340-1, an ad filter may process a page code for removing one or more advertising elements (hereinafter referred to as elements) from the webpage according to one or more advertisement filtering rules. In an example, an element may refer to content. In an implementation, client-side web browser 340-1 may not recognize that the elements were present on the webpage. Consequently, client-side web browser 340-1 may not try to load these elements. Since capabilities of browser extensions are limited and they cannot change the page code before the browser processes the page code, an ad filter may perform page code filtering if high quality filtering is enabled. As can be seen in FIG. 10, an ad filter processes/modifies webpage 1002 to filter/remove content A, content C, content D, and content E. The modified webpage 1004 includes only content B, content F, content G, and content H.

Figure 11:
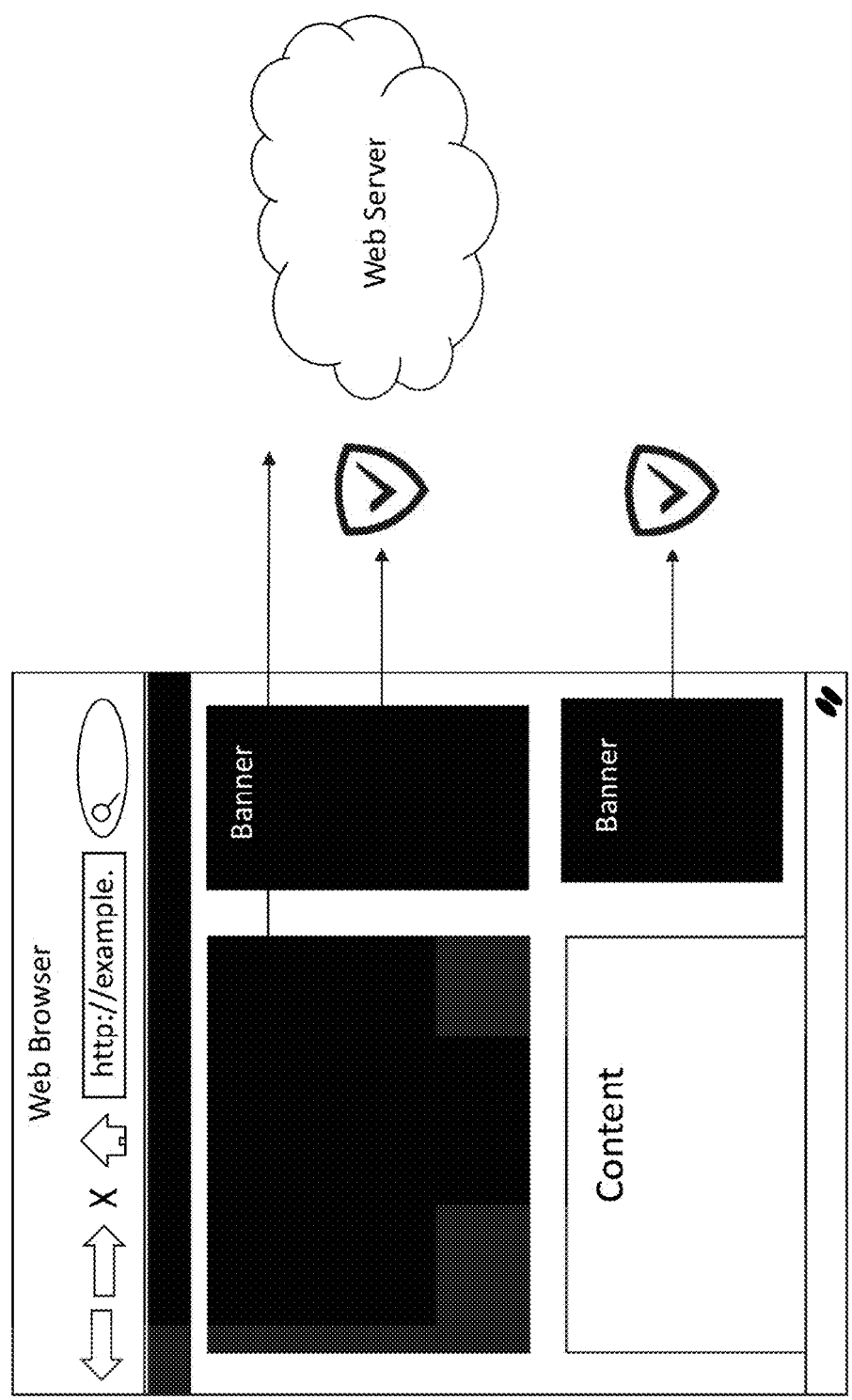
FIG. 11 is an illustration of blocking one or more advertisements in the webpage having one or more advertisements and/or content, according to some embodiments.

FIG. 11 is an illustration 1100 of blocking one or more advertisements in the webpage having one or more advertisements and/or content, according to some embodiments. A browser, such as client-side web browser 340-1 may load all necessary elements on a webpage as defined by a page code. Based on advertisement filtering rules, ad filter may block the loading of elements, such as banner advertisements and/or flash objects. FIG. 11 shows a process of request blocking.

In an example, not all advertising can be blocked with page code filtering or request blocking. Advertising that is embedded in a webpage page dynamically using JavaScript does not require loading of additional elements which could be blocked. In this case, a CSS injection technique may allow for modification of style elements (for example, color, font, location, and visibility of an element) and JavaScript may enable dynamic changes of any element on a webpage. In an example, CSS is an application or a language used for designing of webpages. In an example, display style (for example, color, font, location, and visibility) of elements on a webpage can be set based on one or more rules. JavaScript is also an application or a language that allows dynamic changing of any element on a webpage. According to some embodiments, browser extensions may not be capable of employing page code filtering. In an implementation, during post-processing of a webpage, a browser extension may remove those elements from the webpage which did not load (for example, because loading of these elements was blocked), thus preventing display of an error graphic.

Figure 12:
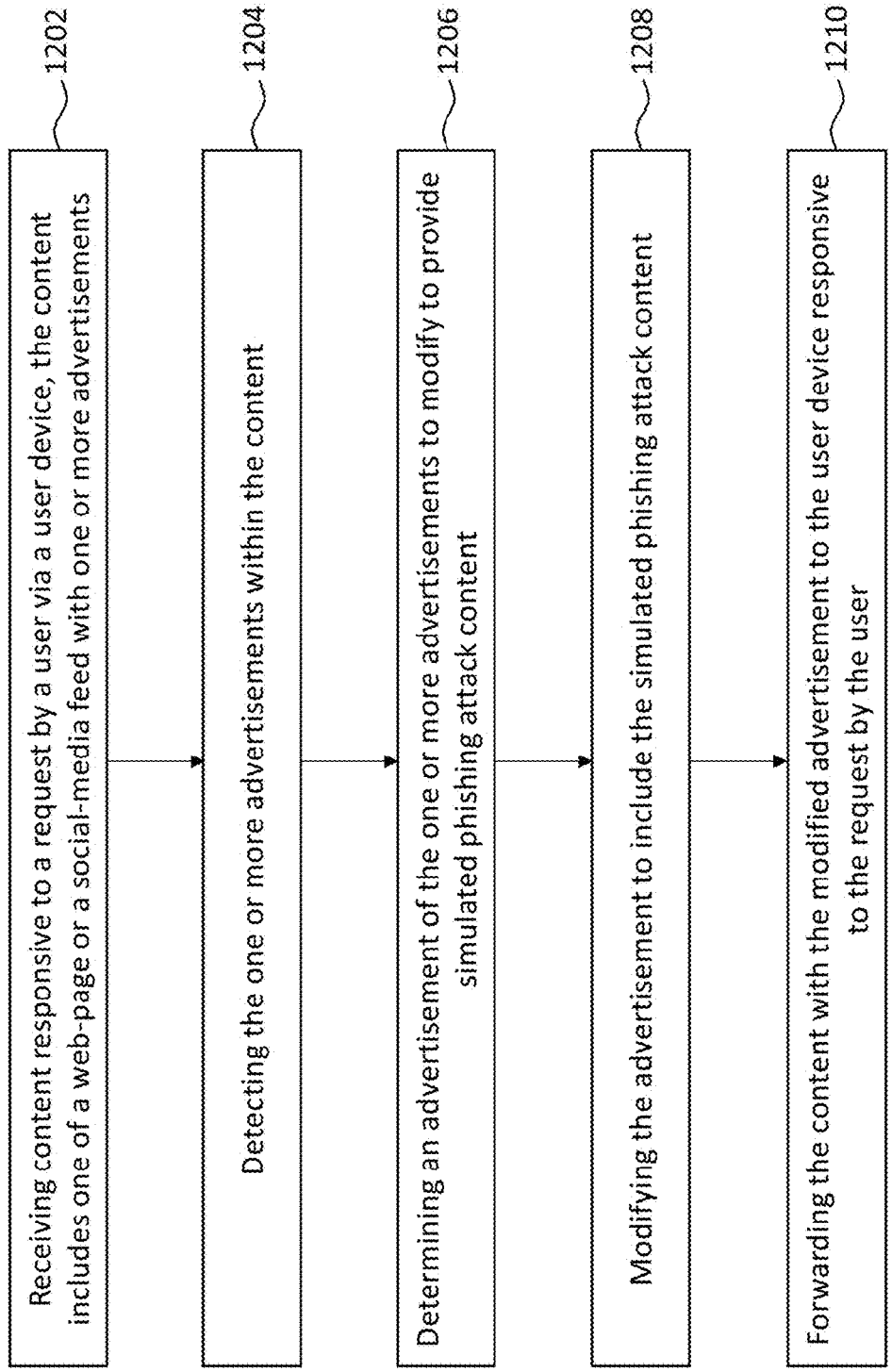
FIG. 12 is a process flow of modifying one or more advertisements of a webpage or a social media feed to create a simulated phishing attack, according to some embodiments.

FIG. 12 depicts a flow chart for modifying one or more advertisements of a webpage or a social media feed to create a simulated phishing attack, according to some embodiments.

Step 1202 includes receiving content responsive to a request by a user via a user device. The content includes one of the webpage or the social media feed with one or more advertisements. In an implementation, security awareness server 202 (or a component therein, such as simulated phishing campaign manager 306) may be configured to intercept the content prior to presenting the content via the user device to the user. Security awareness server 202 may intercept the content prior to user device 212-1 receiving the content.

Step 1204 includes detecting the one or more advertisements within the content. In an implementation, security awareness server 202 (or a component therein, such as simulated phishing campaign manager 306) may be configured to detect the one or more advertisements within the content. In an example, security awareness server 202 or a component therein may detect advertisements in many forms, including images, videos, and text. In an example, security awareness server 202 may detect places within the content that may be appropriate for the insertion of simulated phishing attack content.

Step 1206 includes determining an advertisement of the one or more advertisements to modify to provide simulated phishing attack content. In an implementation, simulated awareness server 202 (or a component therein, such as simulated phishing campaign manager 306) may be configured to determine an advertisement of the one or more advertisements to modify to provide simulated phishing attack content. In an example, simulated phishing attack content may include advertisements and/or content (non-advertisement content). In examples, simulated phishing attack content may refer to a simulated cybersecurity simulated attack that is ad-based including phishing, vishing smsishing, or any other attack vector. In examples, simulated phishing campaign manager 306 determines not to modify advertisements but modifies non-advertisement content.

Step 1208 includes modifying the advertisement to include the simulated phishing attack content. In an implementation, security awareness server 202 (or a component therein, such as simulated campaign phishing campaign manager 306) may be configured to modify the advertisement by replacing the advertisement with the simulated phishing attack content in a form of an advertisement or by inserting the simulated phishing attack content in a form of an advertisement. In some examples, simulated phishing campaign manager 306 may be configured to modify the advertisement by replacing the advertisement with non-advertisement content. In some implementations, security awareness server 202 (or a component therein, such as simulated phishing campaign manager 306) may be configured to modify the advertisement by replacing the advertisement with the simulated phishing attack content in a form of content or by inserting the simulated phishing attack content in a form of content. In an implementation, security awareness server 202 may be configured to modify the advertisement to include one or more elements to pass through an ad blocker. In examples, security awareness server 202 may modify non-advertisement content to pass through an ad blocker. In examples, simulated phishing campaign manager 306 modifies non-advertisement content but does not modify one or more advertisements.

Step 1210 includes forwarding the content with the modified advertisement to the user device responsive to the request by the user. In an implementation, security awareness server 202 (or a component therein, such as simulated phishing campaign manager 306) may be configured to forward the content with the modified/inserted advertisement to user device 212-1 responsive to the request by the user. In an example, the content forwarded to the user may include the modified/inserted advertisement and at least one genuine advertisement. In an example, the content forwarded to the user may include the modified/inserted advertisement and no genuine advertisement. In an implementation, security awareness server 202 may further be configured to track an action by the user with respect to the modified/inserted advertisement. Further, security awareness server 202 may be configured to cause traversal to one of training content or a landing page to provide description of one of a security exploit or an action by the user with respect to the modified/inserted advertisement. In examples, training content or a landing page may provide description of the indicators on the advertisement that the advertisement was malicious. Security awareness server 202 may also be configured to establish a risk score of the user based at least on an action by the user with respect to the modified/inserted advertisement. Security awareness server 202 may also be configured to modify a risk score of the user based at least on an action by the user with respect to the training content or landing page.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
identifying, by one or more processors, one or more sources providing advertisements;
analyzing, by the one or more processors, one or more structures of one or more advertisements provided by the one or more sources;
determining, by the one or more processors based at least on analyzing, one of code construction or content to use for an advertisement within an advertisement-based simulated phishing attack to prevent from being blocked by an advertisement blocker;
generating, by the one or more processors, an advertisement to use within the advertisement-based simulated phishing attack based at least on one of the code construction or the content;
generating, by the one or more processors, the advertisement-based simulated phishing attack to include the generated advertisement and
communicating, by the one or more processors the advertisement-based simulated phishing attack to one or more devices of one or more users.

2. The method of claim 1, wherein the one or more sources comprises one of a social media platform, a social media feed or a website.

3. The method of claim 1, further comprising analyzing, by the one or more processors, the one or more structures of the one or more advertisements to evaluate which of the one or more advertisements have a higher probably not to be blocked by the advertisement blocker.

4. The method of claim 1, further comprising generating, by the one or more processors based at least one of the code construction or the content, a new advertisement for use within the advertisement-based simulated phishing attack and to include with one or more other advertisements as part of the advertisement-based simulated phishing attack.

5. The method of claim 1, further comprising modifying, by the one or more processors, one of the code construction or the content of an existing advertisement to generate the advertisement for the advertisement-based simulated phishing attack.

6. The method of claim 1, further comprising determining, by the one or more processors, a latest one or more structures currently used in the one or more advertisements provided by the one or more sources to use for the advertisement within the advertisement-based simulated phishing attack to provide a higher probability of the advertisement-based simulated phishing attack reaching the one or more users without being blocked by the advertisement blocker.

7. The method of claim 6, further comprising determining, by the one or more processors, a change in the one or more structures used in the one or more advertisements provided by the one or more sources.

8. The method of claim 1, further comprising modifying, by the one or more processors using one of the code construction or the content, an existing advertisement-based simulated phishing attack to provide the advertisement-based simulated phishing attack with a higher probability of not being blocked by the advertisement blocker.

9. A system comprising:
one or more processors, coupled to memory and configured to:
identify one or more sources providing advertisements;
analyze one or more structures of one or more advertisements provided by the one or more sources;
determine, based at least on analyzing, one of code construction or content to use for an advertisement within an advertisement-based simulated phishing attack that to prevent from being blocked by an advertisement blocker;
generate an advertisement to use within the advertisement-based simulated phishing attack based at least on one of the code construction or the content;
generate the advertisement-based simulated phishing attack to include the generated advertisement and
communicate the advertisement-based simulated phishing attack to one or more devices of one or more users.

10. The system of claim 9, wherein the one or more sources comprises one of a social media platform, a social media feed or a website.

11. The system of claim 9, wherein the one or more processors are further configured to analyze the one or more structures of the one or more advertisements to evaluate which of the one or more advertisements have a higher probably to be blocked by the advertisement blocker.

12. The system of claim 9, wherein the one or more processors are further configured to generate, based at least one of the code construction or the content, a new advertisement for use within the advertisement-based simulated phishing attack and to include with one or more other advertisements as part of the advertisement-based simulated phishing attack.

13. The system of claim 9, wherein the one or more processors are further configured to modify one of the code construction or the content of an existing advertisement to generate the advertisement for the advertisement-based simulated phishing attack.

14. The system of claim 9, wherein the one or more processors are further configured to determine latest one or more structures currently used in the one or more advertisements provided by the one or more sources to use for the advertisement within the advertisement-based simulated phishing attack to provide a higher probability of the advertisement-based simulated phishing attack reaching the one or more users without being blocked by the advertisement blocker.

15. The system of claim 14, wherein the one or more processors are further configured to determine a change in the one or more structures used in the one or more advertisements provided by the one or more sources.

16. The system of claim 9, wherein the one or more processors are further configured to modify, using one of the code construction or the content, an existing advertisement-based simulated phishing attack to provide the advertisement-based simulated phishing attack with a higher probability of not being blocked by the advertisement blocker.

* * * * *